US009511704B2

(12) United States Patent
Massicotte et al.

(10) Patent No.: US 9,511,704 B2
(45) Date of Patent: Dec. 6, 2016

(54) ANCHOR

(71) Applicant: BOMBARDIER RECREATIONAL PRODUCTS INC., Valcourt (CA)

(72) Inventors: Alain Massicotte, Orford (CA); Ivan Brousseau, Granby (CA); Francois Chenevert, Sherbrooke (CA); Thierry Cotnoir, Sherbrooke (CA); Vincent Tognon, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/330,831

(22) Filed: Jul. 14, 2014

(65) Prior Publication Data
US 2014/0319306 A1 Oct. 30, 2014

Related U.S. Application Data

(63) Continuation of application No. 13/805,895, filed as application No. PCT/US2010/040626 on Jun. 30, 2010, now Pat. No. 8,777,531.

(51) Int. Cl.
*B60P 7/08* (2006.01)
(52) U.S. Cl.
CPC ............... *B60P 7/0807* (2013.01); *B60P 7/08* (2013.01); *B60P 7/0815* (2013.01)
(58) Field of Classification Search
CPC ........................................................ B60P 7/08
USPC .............................. 410/82, 84; 403/323, 343
See application file for complete search history.

(56) References Cited

U.S. PATENT DOCUMENTS

| 2,676,680 | A | 4/1954 | Kindorf |
| 3,554,075 | A | 1/1971 | Johnson |
| 3,749,438 | A | 7/1973 | Loomis et al. |
| 5,123,795 | A | 6/1992 | Engel et al. |
| 5,155,960 | A | 10/1992 | Shaanan |
| 5,655,865 | A | 8/1997 | Plank et al. |
| 5,738,471 | A | 4/1998 | Zentner et al. |
| 6,237,970 | B1 | 5/2001 | Joannou |
| 6,585,465 | B1 | 7/2003 | Hammond et al. |
| 7,393,168 | B2 | 7/2008 | Wei |
| 7,497,651 | B2 | 3/2009 | Harberts et al. |
| 7,874,774 | B2 | 1/2011 | Peterson |

(Continued)

OTHER PUBLICATIONS

International Search Report from PCT/US2010/040626; Copenheaver Blaine R.; Sep. 1, 2010.

(Continued)

*Primary Examiner* — H Gutman
(74) *Attorney, Agent, or Firm* — BCF LLP

(57) ABSTRACT

An anchor comprises first, second and third flanges. A surface of the first flange facing the second flange defines a plane. A contour of the first flange projected onto the plane extending beyond a contour of the second flange projected onto the plane. A base connecting part includes the third flange and the second flange. An accessory connecting part operatively connected to the base connecting part includes the first flange. The third flange is movable relative to at least one of the first and second flanges between a first position and a second position. In the first position, a contour of the third flange projected onto the plane is contained within the contour of the second flange projected onto the plane. In the second position, the contour of the third flange projected onto the plane extends beyond the contour of the second flange projected onto the plane.

20 Claims, 13 Drawing Sheets

(56) References Cited

U.S. PATENT DOCUMENTS

| 8,550,757 B2 | 10/2013 | Anderson et al. |
| 2002/0102145 A1 | 8/2002 | Grandy |
| 2006/0188355 A1 | 8/2006 | Warnock |
| 2013/0094920 A1 | 4/2013 | Massicotte et al. |

OTHER PUBLICATIONS

International Search Report from PCT/US2010/040629; Copenheaver Blaine R.; Sep. 1, 2010.

ANCHOR

CROSS-REFERENCE

The present application is a continuation of U.S. patent application Ser. No. 13/805,895, filed Dec. 20, 2012, which is a national phase entry of International Patent Application No. PCT/2010/040626, filed Jun. 30, 2010, the entirety of both of which is incorporated herein by reference.

TECHNICAL FIELD

The present invention generally relates to anchors for use in transporting items on a vehicle.

BACKGROUND

Many vehicles are designed to have a cargo space and/or rack upon which different items are secured for transportation. In many cases, the items are secured to the rack with bungee cords and tie downs that have their ends hooked into apertures of the rack itself or around the contour of the rack.

However, some users experience difficulties when attaching and retaining the items to the rack. For example, the items are sometimes hard to retain with the bungee cords so they would not slide around on the rack while traveling over rough terrain. Other times, the hooked ends of the cord or strap are too large to pass through apertures of the rack. Furthermore, bungee cords and ties downs tend to be cumbersome to use. When not in use, they must be stored elsewhere or attached to the rack.

Using the bungee cords and tie downs with the racks can be unsatisfying to the user. Therefore, there is a need for a system for transporting cargo items in various vehicles.

SUMMARY

It is an object to ameliorate at least some of the inconveniences of the prior art.

In a first aspect, an anchor for securing items on a base of a vehicle is provided. The base has apertures sized to receive the anchors. The anchor is designed to be secured to the base and also to secure accessories or items to the base. The anchor has a versatile use. One can use it to directly secure an accessory or item to the base, or to retain an accessory or item using the anchor itself or a connector.

Thus, as broadly embodied herein, an anchor comprises a first flange, a second flange, and a third flange. The second flange is disposed between the first flange and the third flange. A surface of the first flange facing the second flange defines a plane. A contour of the first flange projected onto the plane extends beyond a contour of the second flange projected onto the plane. The anchor comprises a base connecting part. The base connecting part includes the third flange and the second flange. An accessory connecting part is operatively connected to the base connecting part. The accessory connecting part includes the first flange; and the third flange is movable relative to at least one of the first and second flanges between a first position and a second position. When in the first position, a contour of the third flange projected onto the plane is contained within the contour of the second flange projected onto the plane. When in the second position, the contour of the third flange projected onto the plane extends beyond the contour of the second flange projected onto the plane.

In an additional aspect, the anchor further comprises at least one connector.

In a further aspect, the third flange has a longitudinal axis. The second flange has a longitudinal axis. When projected onto the plane, in the first position, the longitudinal axis of the third flange and the longitudinal axis of the second flange are at a first angle relative to each other. In the second position, the longitudinal axis of the third flange and the longitudinal axis of the second flange are at a second angle relative to each other, and the second angle is different from the first angle.

In an additional aspect, the first angle is 0 degrees and the second angle is 90 degrees.

In a further aspect, a recess is disposed between the first flange and the second flange, and a seal disposed in the recess.

In an additional aspect, a lever is connected to the third flange for moving the third flange between the first position and the second position.

In a further aspect, a pair of tabs extends from the second flange toward the third flange. A contour of the pair of tabs projected onto the plane is contained within the contour of the second flange projected onto the plane.

In an additional aspect, the second flange includes a chamfer.

In a further aspect, the contour of the third flange projected onto the plane has a first shape. The second flange has a first part and a second part. The first part of the second flange is disposed between the first flange and the second part of the second flange. A contour of the second part of the second flange projected onto the plane has the first shape. A contour of the first part of the second flange projected onto the plane has a second shape.

In an additional aspect, the first shape and the second shape are a same shape.

In a further aspect, the first and second shapes are irregular polygons.

In an additional aspect, the first and second shapes are irregular hexagons.

In a further aspect, the first shape is an irregular hexagon and the second shape is an irregular pentagon.

In an additional aspect, the at least one connector includes an aperture.

In a further aspect, the anchor further comprises a case. A latch is operatively connected to the case. The latch comprises the third flange. A lever is connected to the latch for moving the third flange between the first position and the second position.

In an additional aspect, a biasing mechanism biases the third flange toward the second part of the second flange.

In a further aspect, the biasing mechanism includes a plurality of spring washers.

In an additional aspect, the third flange includes a pair of cams, and each of the pair of cams has a ramp surface.

In a further aspect, the anchor further comprises a flat side. The first flange is disposed between the flat side and the second flange.

In an additional aspect, the case comprises a first cavity and the latch has a longitudinal extending bore. A stem retains the latch to the case. The stem has a T-top. The stem extends through the longitudinal extending bore of the latch. The T-top of the stem is disposed in the first cavity. An under surface of the T-top of the stem is connected to a top of the latch by a C-clip.

In a further aspect, the case comprises a second cavity. The second cavity is connected to the second cavity. The second cavity receives partially the lever.

The term 'brim' refers to external surface(s) adjacent to an edge of an aperture.

The term 'rim' refers to internal surface(s) of an aperture adjacent to the edge(s) of the aperture.

The term 'contour' refers to a shape of an element formed by its sides and edges. It should be understood that the shape of an element is independent of its size. Elements may have the same shape but have different size (for example two round holes of different diameters).

The term 'flange' refers to an outwardly extending portion. Steps and lips are two examples of flanges.

The term 'recess' refers to an inwardly extending portion. For example, two adjacent flanges form a recess therebetween. In another example, an inwardly extending portion of an otherwise flat member forms a recess.

Also, terms related to spatial orientation such as forwardly, rearwardly, left, and right, are as they would normally be understood by a driver of the vehicle sitting thereon in a normal riding position.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
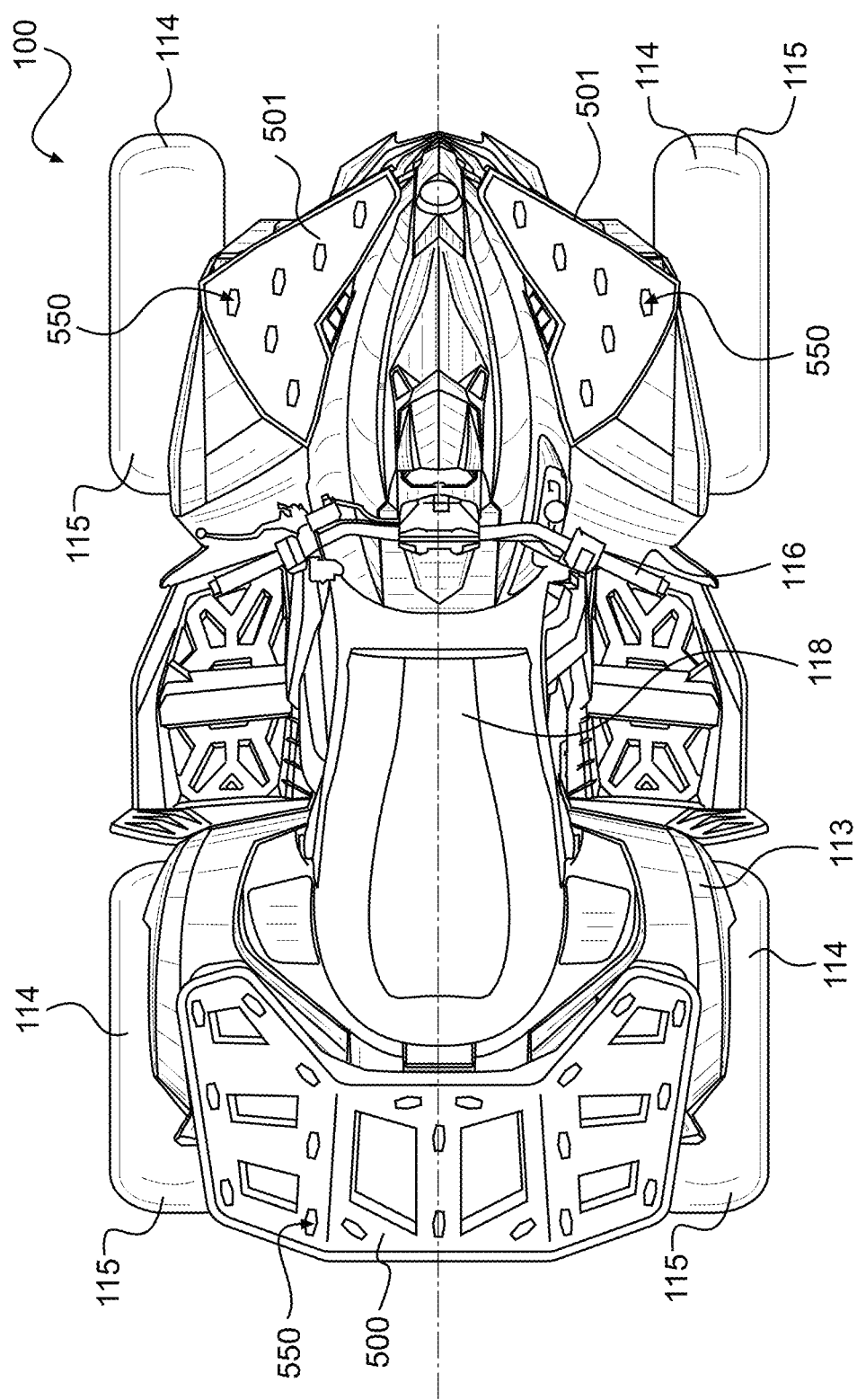
FIG. 1 is a top view of an all-terrain vehicle (ATV) with front and rear racks according to a first embodiment.

Turning to FIG. 1, the general construction of an all-terrain vehicle (ATV) 100 will be described. It should be understood that the ATV 100 could be another type of off-road vehicle, such as recreational utility vehicles, side-by-side off-road vehicles, or turf vehicles.

The ATV 100 includes a frame (not shown) to which is mounted a body 113 and an internal combustion engine (not shown) for powering the vehicle. Four wheels 114 are connected to the frame. The four wheels 114 have low-pressure balloon tires 115 adapted for off-road conditions and traversing rugged terrain. The two front wheels 114 are suspended from the frame by respective front suspension assemblies (e.g. double A-arm suspension systems) (not shown) while the two rear wheels 114 are suspended from the frame by respective rear suspension assemblies (e.g., rigid swing arm suspension systems) (not shown).

The ATV 100 further includes a straddle seat 118 mounted to the frame for supporting a driver. It is contemplated that the seat 118 could be configured to also accommodate a passenger.

The ATV 100 further includes a steering mechanism which is rotationally supported by the frame to enable a driver to steer the vehicle. The steering mechanism includes a handlebar 116 connected to a steering column (not shown) for actuating steering linkages connected to left and right front wheels 114.

The engine is a 4-cycle single overhead cam engine. As will be readily appreciated by those of ordinary skill in the art, other types and configurations of internal combustion engines can be used in the ATV 100. The cylinders house reciprocating pistons connected to a crankshaft as is also well known in the art. The crankshaft of the engine is coupled to a drivetrain which delivers torque to the rear wheels 114, providing at least two-wheel-drive (2WD), and optionally also delivers torque to the front wheels 114 for four-wheel-drive (4WD) traction.

The ATV 100 has other features and components such as headlights and handles. As it is believed that these features and components would be readily recognized by one of ordinary skill in the art, further explanation and description of these components will not be provided herein.

The ATV 100 includes a rack 500 at a rear, and a pair of front racks 501. The racks 500, 501 are areas where cargo items or accessories are to be secured. It is contemplated that the ATV 100 could have a rear platform, and have the rack 500 be connected to that rear platform. It is contemplated that the ATV 100 could have none, only one or more than two front racks 501, and could have more than one rack 500. The racks 500, 501 have a plurality of rack apertures 550. The rack apertures 550 are used in conjunction with anchors 400 (shown in detail in FIGS. 6 to 9) to secure the cargo items or accessories at various locations on the racks 500, 501. The racks 500, 501, the anchors 400 and the different accessories will be described in greater detail below.

Figure 2:
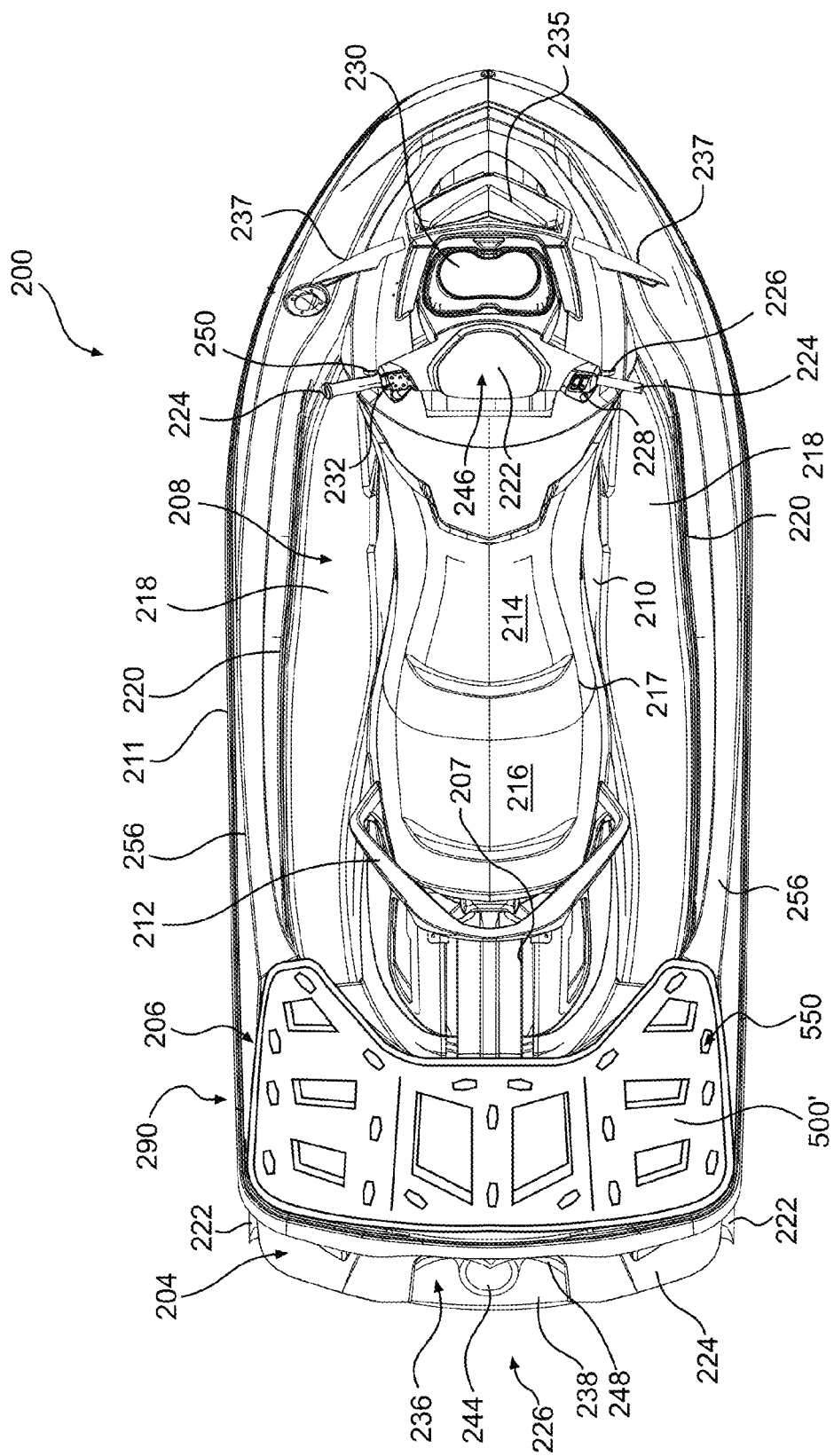
FIG. 2 is a top view of a personal watercraft with a rack according to a second embodiment.

Turning to FIG. 2, the general construction of a personal watercraft 200 will be described. It should be understood that the personal watercraft 200 could be another type of watercraft, and could have a construction other than the one described.

The watercraft 200 is made of a hull 204, a sub-deck 206, and a deck 208. The hull 204 and sub-deck 206 are joined together, preferably by an adhesive, to form a hull and sub-deck (HSD) assembly. Rivets or other fasteners may also join the hull 204 and sub-deck 206. A bumper 211 generally covers the joint between the hull 204 and the sub-deck 206. The volume created between the hull 204 and the sub-deck 206 is known as the engine compartment. The engine compartment accommodates an engine (not shown) as well as the muffler, exhaust pipe, gas tank, electrical system (including for example a battery and an electronic control unit), air box, storage bins (not shown) and other elements required by or desired for the watercraft 200. The deck 208 is designed to accommodate a driver and a passenger. The deck 208 is suspended on the HSD assembly by a rear suspension member in the form of a rear suspension arm 207 and a front suspension assembly (not shown). It is contemplated that the deck 208 could be fixedly connected to the HSD assembly. It is also contemplated that the sub-deck 206 could be omitted and that the deck 208 could be connected directly to the hull 204.

The hull 204 is provided with a combination of strakes (not shown) and chines (not shown). A strake is a protruding portion of the hull 204. A chine is the vertex formed where two surfaces of the hull 204 meet. It is this combination of strakes and chines that will give, at least in part, the watercraft 200 its riding and handling characteristics.

Sponsons 222 are located on either side of the hull 204 near the transom 224. The sponsons 222 have an arcuate undersurface, which give the watercraft 200 both lift while in motion and improved turning characteristics.

A jet propulsion system 226, as known in the art, is connected to the hull 204. The jet propulsion system 226 pressurizes water to create thrust. From an intake ramp, water then enters a jet pump unit (not shown). The jet pump unit is located in what is known as the tunnel 236. The tunnel 236 is opened towards the rear, and is defined at the front, sides and top by the hull 204, and at the bottom by a ride plate 238. The ride plate 238 is the surface on which the watercraft 200 rides or planes. The jet pump unit includes an impeller and a stator (not shown) enclosed in a cylindrical housing. The impeller is coupled to the engine by one or more shafts (not shown), such as a driveshaft and an impeller shaft. The rotation of the impeller pressurizes the water, which then moves over the stator that is made of a plurality of fixed stator blades (not shown). Once the water leaves the jet pump, it goes through a venturi (not shown). Since the venturi's exit diameter is smaller than its entrance diameter, the water is accelerated further, thereby providing more thrust. A steering nozzle 244 is pivotally attached to the venturi so as to pivot about a vertical axis (not shown). The steering nozzle 244 could also be supported in other ways without a direct connection to the venturi. The steering nozzle 244 is operatively connected to the helm assembly 246 such that when the helm assembly 246 is turned, the steering nozzle 244 pivots. This movement redirects the pressurized water coming from the venturi, so as to redirect the thrust and steer the watercraft 200 in the desired direction. A reverse gate 248 is pivotally attached to the sidewalls of the tunnel 236. It is contemplated that the reverse gate 248 could alternatively be pivotally attached to the venturi or the steering nozzle 244. The reverse gate 248 is operatively connected to an electric motor (not shown) and the driver of the watercraft can control the position of the reverse gate 248 by pulling lever 250 located on the left side of the helm assembly 246 which is in electrical communication with the electric motor. It is contemplated that the reverse gate 248 could alternatively be mechanically connected to a reverse handle to be pulled by the driver. To make the watercraft 200 move in a reverse direction, the reverse gate 248 is pivoted in front of the steering nozzle 244 and redirects the water leaving the jet propulsion system 226 towards the front of the watercraft 200, thereby thrusting the watercraft 200 rearwardly.

The deck 208 has a centrally positioned straddle seat 217 placed on top of a pedestal 210 to accommodate the driver and the passenger in a straddling position. A grab handle 212 is provided between the pedestal 210 and the straddle-type seat 108 at the rear of the straddle seat 217 to provide a handle onto which a passenger may hold on. The straddle seat 217 has a first seat portion 214 to accommodate the driver and second seat portion 216 to accommodate the passenger. The straddle seat 217 is pivotally connected to the pedestal 210 at the front thereof by a system of linkages and is connected at the rear thereof by a latch assembly (not shown). The straddle seat 217 selectively covers an opening (not shown), defined by a top portion of the pedestal 210, which provides access to the air intake unit, which once removed, provides access to the upper portion of the engine.

Located on either side of the pedestal 210, between the pedestal 210 and gunnels 256 of the sub-deck 206, are a pair of generally horizontal footrests 218 designed to accommodate the driver's and passenger' feet. A seal 220 is disposed between each footrest 218 and its corresponding gunnel 256 on the sub-deck 206. Since an upper end of the side channels is wider than a lower end of the side channels, the seals are preferably made of a flexible material, such as rubber, that can compress and expand to follow the inner side of the gunnels 256 as the HSD assembly moves relative to the deck 208. The footrests 218 are preferably covered by carpeting made of a rubber-type material.

The helm assembly 246 is positioned forwardly of the straddle-type seat 217. As previously mentioned, the helm assembly 246 is used to turn the steering nozzle 244, and therefore the watercraft 200. The helm assembly 246 has a central helm portion 222 that may be padded, and a pair of steering handles 224. The right steering handle 224 is provided with a throttle lever 226 allowing the driver to control the speed of the watercraft 200. The left steering handle is provided with the lever 250 to control the position of the reverse gate 248, as previously mentioned. The central helm portion 222 has buttons 228 that allow the driver to modify what is displayed (such as speed, engine rpm, and time) on the display cluster 230 located forwardly of the helm assembly 246. Additional buttons 232 are provided on the helm portion 222 to allow the driver to adjust the force absorption characteristics of the suspension elements. The helm assembly 246 may be pivotable about a horizontal axis to allow the height of the helm assembly 246 to be adjusted to suit the driver's preference. The display cluster 230 also may move about the horizontal axis with the helm assembly 246.

The deck 208 is provided with a hood 235 located forwardly of the helm assembly 246. A hinge (not shown) is attached between a forward portion of the hood 235 and the deck 208 to allow the hood 235 to move to an opened position to provide access to a front storage bin (not shown). A latch (not shown) located at a rearward portion of the hood 235 locks the hood 235 into a closed position. When in the closed position, hood 235 prevents access to the front storage bin. Rearview mirrors 237 are positioned on either side of the hood 235 to allow the driver to see behind the watercraft 200 while driving.

The watercraft 200 has other features and components which would be readily recognized by one of ordinary skill in the art, further explanation and description of these components will not be provided herein.

A rack 500' is connected on the rear portion 290 of the sub-deck 206. The rack 500' is similar to the racks 500, 501. Details of the rack 500' will be described below with respect to the rack 500.

Figure 3:
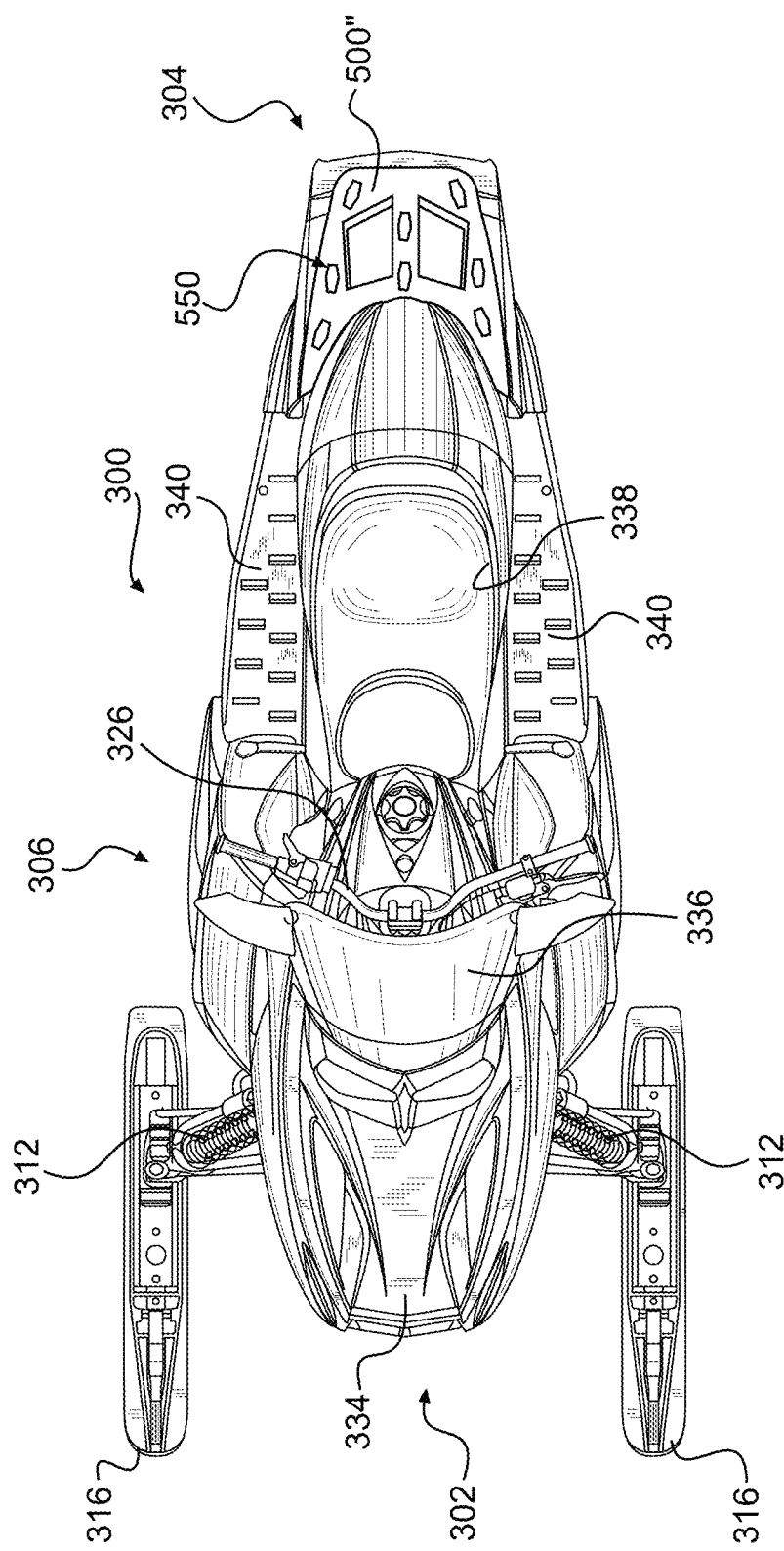
FIG. 3 is a top view of a snowmobile with a rack according to a third embodiment.

Referring now to FIG. 3, the general construction of a snowmobile 300 will be described. It should be understood that the snowmobile 300 could be another type of snowmobile, and could have a construction other than the one described.

The snowmobile 300 has a front end 302 and a rear end 304, which are defined consistently with the forward travel direction of the vehicle. The snowmobile 300 includes a chassis 306 which includes a tunnel (not shown), an engine cradle portion (not shown), and a front suspension assembly portion 312. An engine (not shown) is carried by the engine cradle portion of the chassis 306. A ski and steering assembly is provided, in which two skis 316 (left and right) are positioned at the front end 302 of the snowmobile 300, and are attached to the front suspension assembly portion of the chassis 306 through the front suspension assembly 312. The front suspension assembly 312 includes ski legs, supporting arms and ball joints for operatively joining the respective ski legs, supporting arms and a steering column. The steering column at its upper end is attached to a steering device, a handlebar 326 which is positioned forward of a rider and behind the engine to rotate the ski legs and thus the skis 316, in order to steer the vehicle.

An endless drive track (not shown) is positioned at the rear end 304 of the snowmobile 300 and is disposed under the tunnel. The endless drive track is operatively connected to the engine through a belt transmission system (not shown). Thus, the endless drive track is driven to run about a rear suspension assembly (not shown) for propulsion of the snowmobile 300. The endless drive track is engaged with and driven by a drive sprocket (not shown) which is journaled by the tunnel and is driven by the engine through the belt transmission system. The endless drive track is suspended for movement relative to the chassis 306, by the rear suspension assembly. The rear suspension assembly includes a slide frame assembly (not shown) which primarily includes a pair of spaced apart slide rails (not shown) that engage the inner side of the ground-engaging portion of the endless drive track. The slide frame assembly journals a plurality of backup rollers (not shown) and four idler rollers (not shown). In addition, further rollers are carried by the tunnel, in order to define the path over which the endless drive track travels.

At the front end 302 of the snowmobile 300, there are provided fairings 334 that enclose the engine and the belt transmission system, thereby providing an external shell that not only protects the engine and the belt transmission system, but can also be decorated to make the snowmobile 300 more aesthetically pleasing. The fairings 334 include a hood and one or more side panels which are all openable to allow access to the engine and the belt transmission system when this is required, for example for inspection or maintenance of the engine and/or the belt transmission system. A windshield 336 is connected to the fairings near the front end 302 of the snowmobile 300, or may be attached directly to the handlebar 326. The windshield 336 acts as a windscreen to lessen the force of the air on the rider while the snowmobile 300 is moving.

A seat 338 extends from near the rear end 304 of the snowmobile 300 to near the handlebar 326. A rear portion of the seat 338 may include a storage compartment, or may be used to accept a passenger seat. Two foot rests 340 are positioned on opposed sides of the snowmobile 300 below the seat 338 to accommodate the rider's feet.

The snowmobile 300 has other features and components which would be readily recognized by one of ordinary skill in the art, further explanation and description of these components will not be provided herein.

A rack 500" is connected to the rear 304 of the snowmobile 300. The rack 500" is similar to the racks 500, 501. Details of the rack 500" will be described below with respect to the rack 500.

Figure 4:
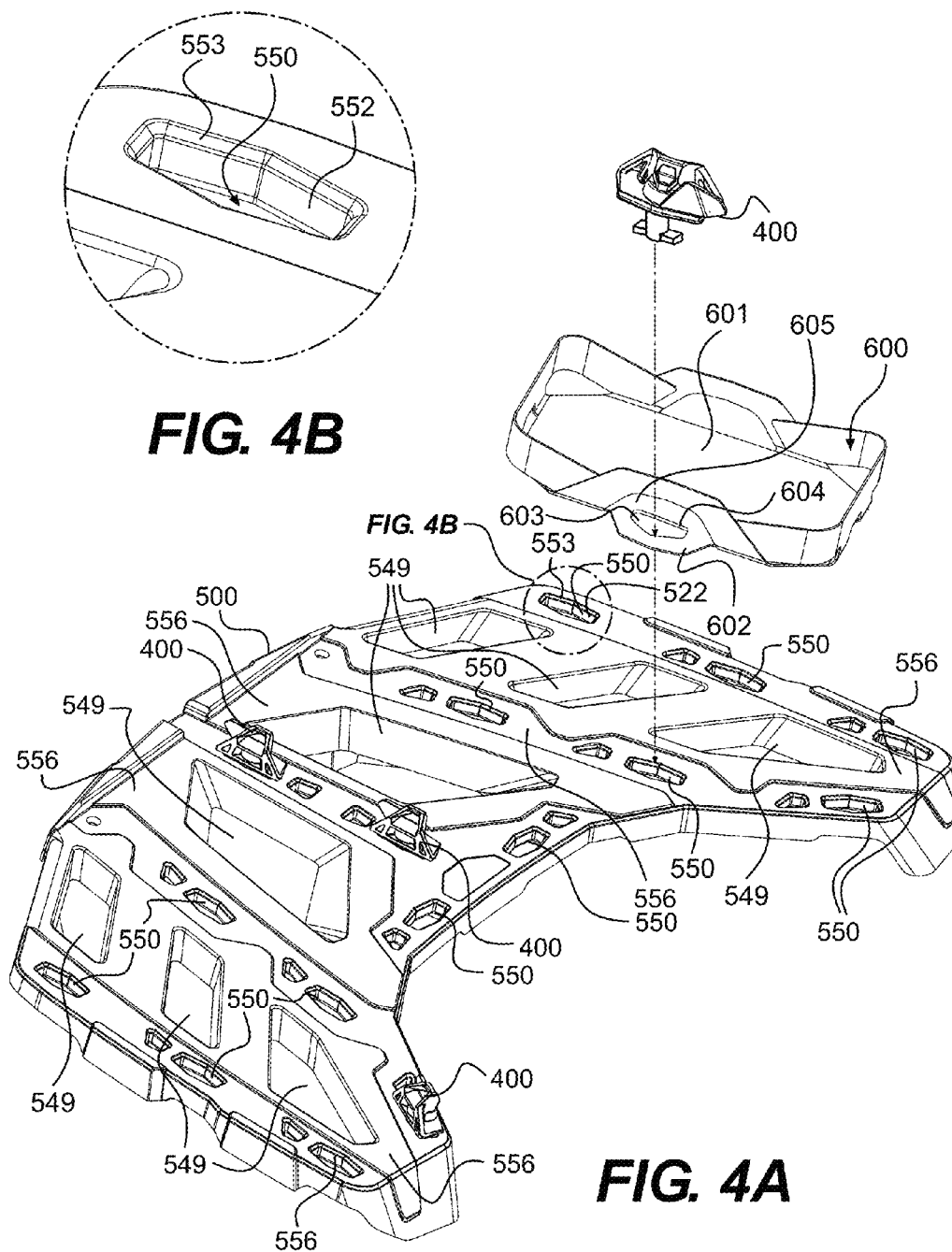
FIG. 4A is a perspective exploded view, taken from a front, left side, of the rear rack of the ATV of FIG. 1 with a plurality of anchors and an accessory.
FIG. 4B is a close-up of an aperture of the rack of FIG. 4A.
Figure 5:
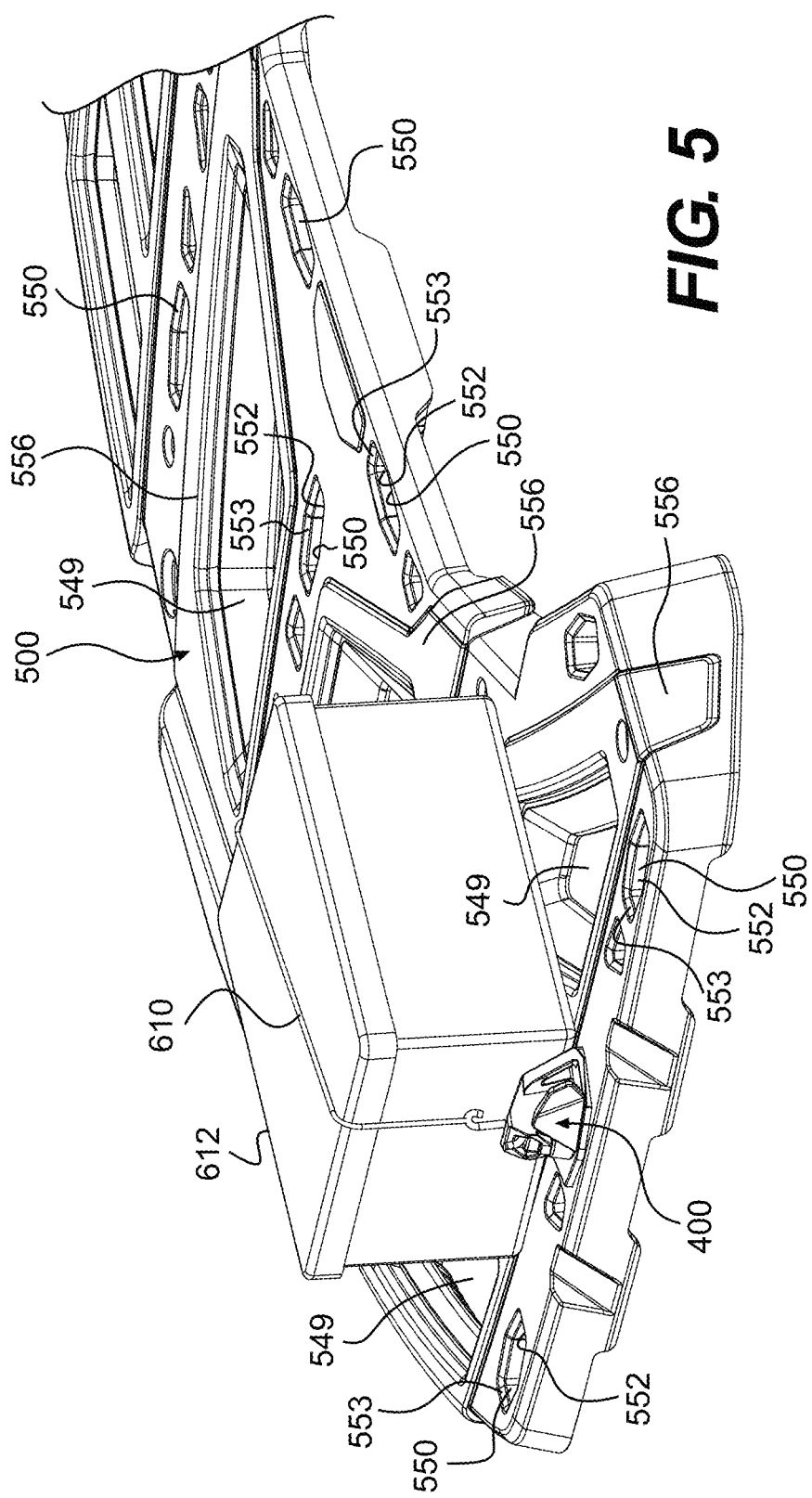
FIG. 5 is a partial view of the rack of FIG. 4A with an item retained by a connector hooked to an anchor.

Turning now to FIGS. 4A, 4B and 5, the rack 500 will be described in greater detail. The rack 500 is a generally flat surface having the plurality of rack apertures 550. Although the rack 500 is shown as a flat surface with a plurality of rack apertures 550, it is contemplated that the rack 500 could not be flat and could have only one rack aperture 550. For example, the rack 500 could be as simple as a C-shaped extruded rod with an aperture between ends of the C forming the rack aperture 550. The rack 500 is made of plastic. It is contemplated that the rack 500 could be made of a material other than plastic.

As best seen in FIG. 4B, each of the rack apertures 550 has a rim 552 and an upper brim 553 (a lower brim not being shown). The rim 552 is an inside surface of the rack aperture 550 between the upper brim 553 and the lower brim. The upper brim 553 is the upper lateral surface of the rack aperture 550. The upper brim 553 is chamfered. The rack apertures 550 have an irregular hexagonal shape. As will be described in greater details below, the rim 552 and brims (upper brim 553 and lower brim) are congruent with a part (rack receiving part) of the anchor 400. It is contemplated that the rack apertures 550 could have a shape different from hexagonal. It is contemplated that the rack apertures 550 could be a regular polygon. It is contemplated that the brim 553 could not be chamfered. It is also contemplated that the rack apertures 550 could not be congruent with the anchors 400, as long as the rack apertures 550 allow the anchors 400 to be inserted therein, and the anchor 400 can brace the rack aperture 550, as will be described below. It is contemplated that the rim 552 and the upper brim 553 could have a shape different from each other.

As best seen in FIG. 4A, the rack 500 also has a plurality of apertures 549. The apertures 549 are larger than the rack apertures 550 and are designed to reduce the weight of the rack 500. It is contemplated that the apertures 549 could be smaller than the rack apertures 550. It is also contemplated that the apertures 549 could be omitted.

Also seen in FIG. 4A, the rack 500 has, on a top face, a plurality of pads 556 for providing friction with the accessories or items to be secured on the rack 500. The pads 556 are made of neoprene. It is contemplated that the pads 556 could be omitted. It is also contemplated that the pads 556 could be made of a different material.

Figure 12:
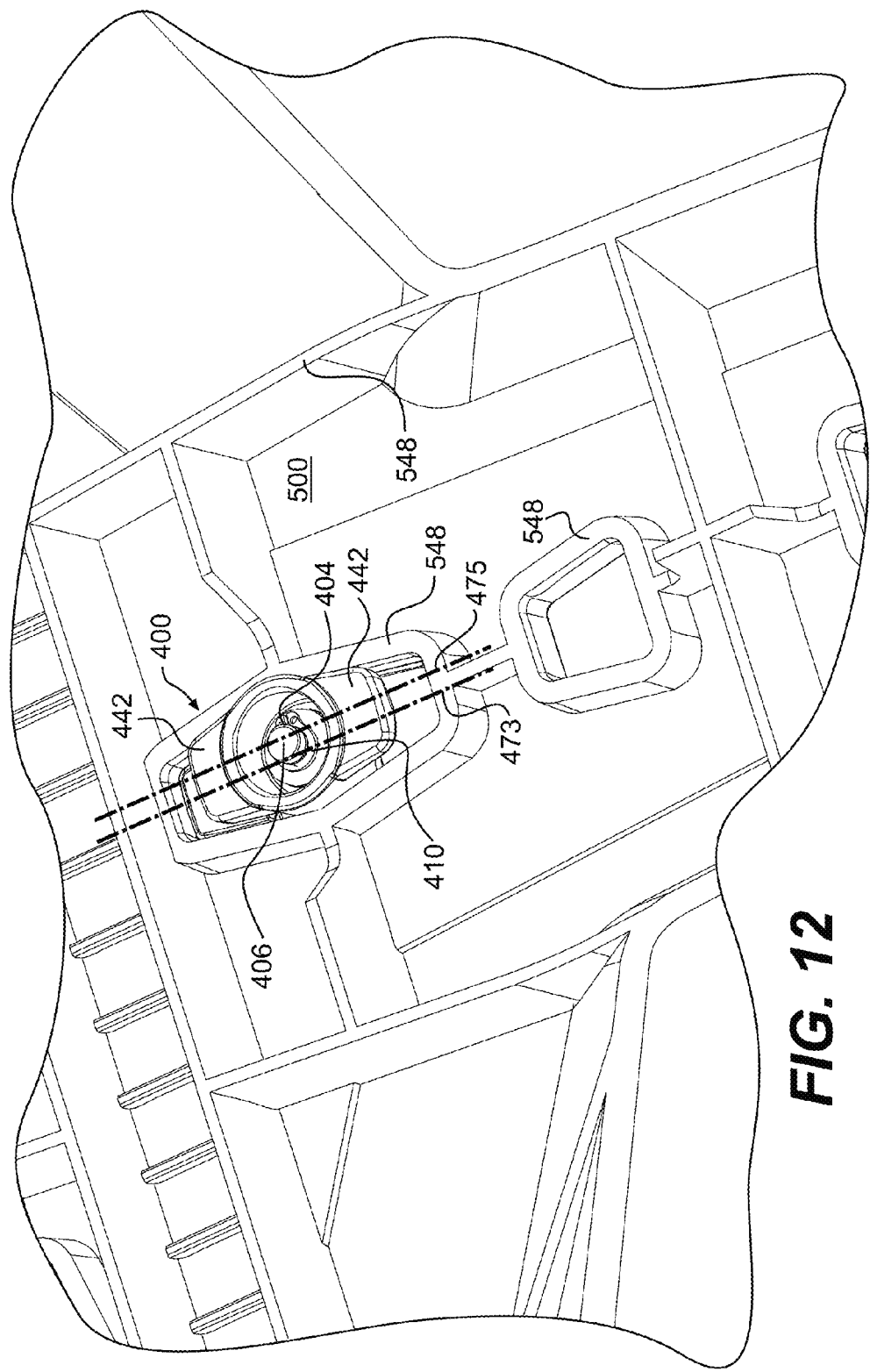
FIG. 12 is a bottom perspective view of the rack of FIG. 4A with one of the anchors shown in the unlocked position.
Figure 13:
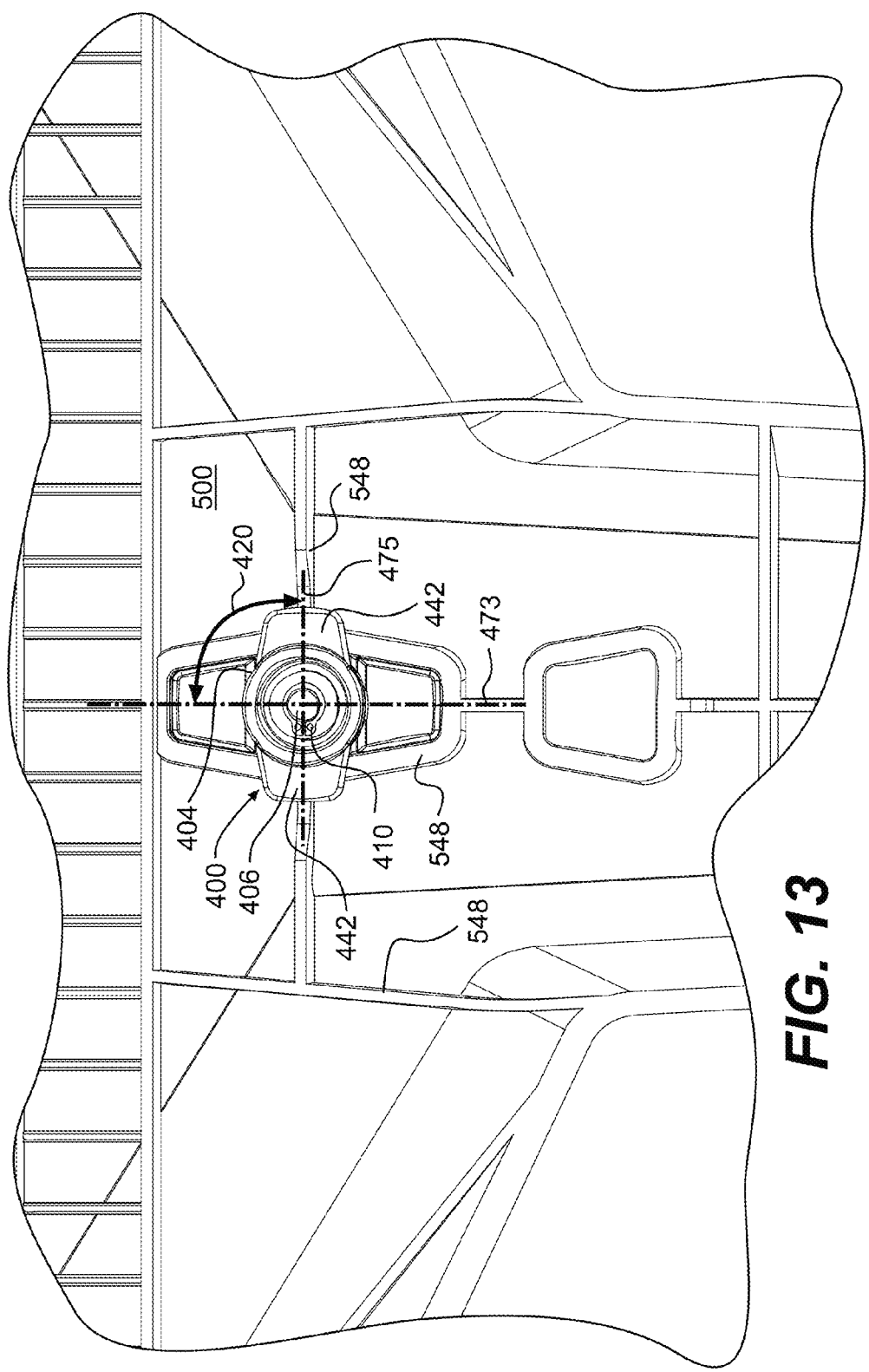
FIG. 13 is a bottom plan view of the rack of FIG. 4A with one of the anchors shown in the locked position.
Figure 8:
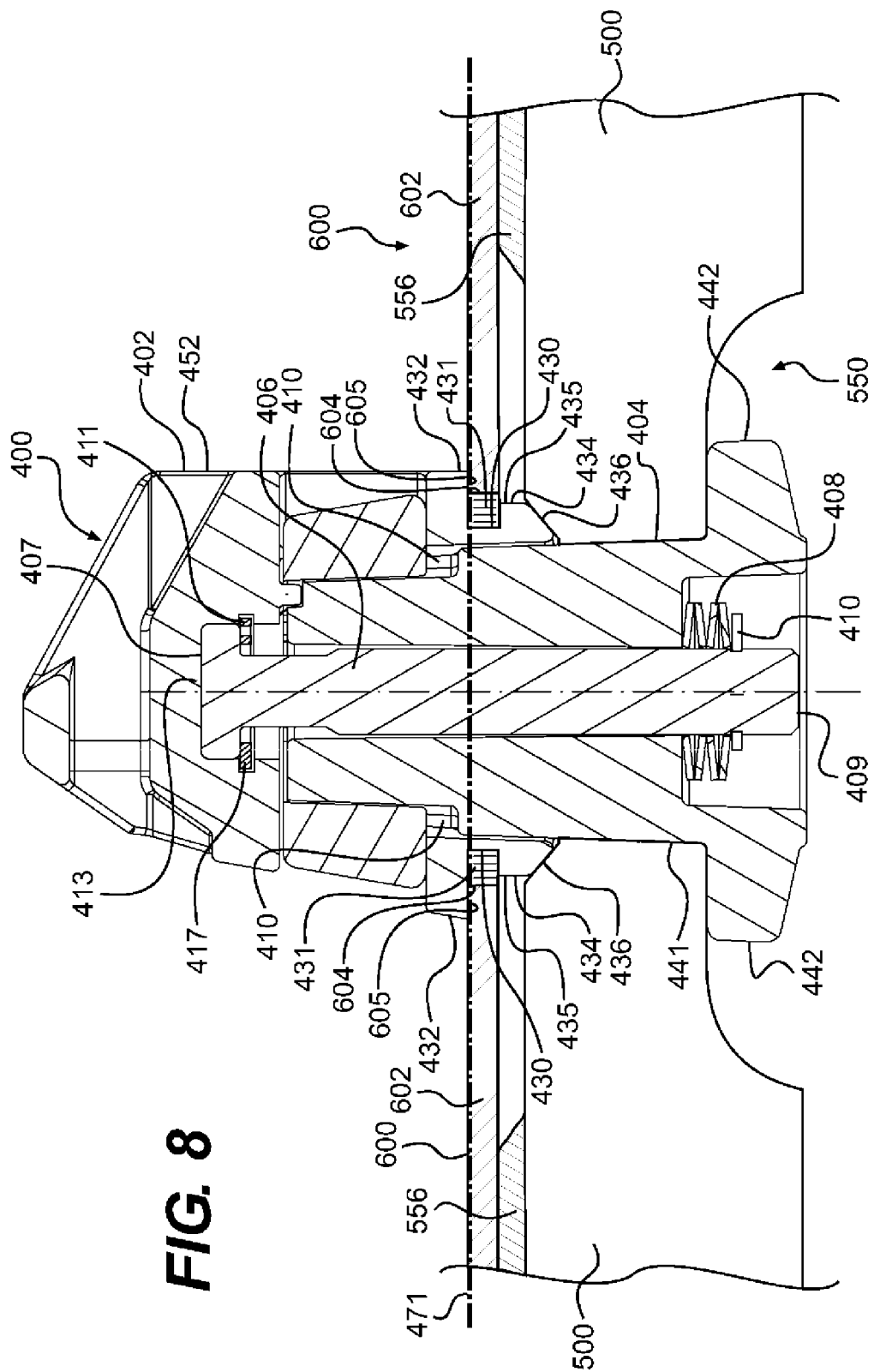

As best seen in FIGS. 12 and 13, a bottom face of the rack 500 also has a plurality of ribs 548. The plurality of ribs 548 adds strength to the rack 500 without adding too much weight. Some of the ribs 548 are disposed around the rack apertures 550. These ribs 548 provide sliding surfaces during locking of the anchors 400, as will be described below. It is contemplated that the ribs 548 could be omitted.

It is contemplated that the rack 500 could have a different orientation and still be used for securing to items or accessories. For example, the rack 500 could be positioned vertically or at an angle.

The racks 501, 500', 500" have a similar construction.

As best seen in FIG. 4A, a holder 600 is removably connected to the top face of the rack 500 via two of the anchors 400 (only one being shown) securing two opposite sides of the holder 600. As will be described below, the anchors 400 are movable by a user between a locked position (shown in FIG. 13) where the anchors 400 are secured on the rack 500 and to the holder 600, and an unlocked position (shown in FIG. 12) where the anchors 400 are not secured to the rack 500 nor the holder 600. As will be described below, it is contemplated that the anchor 400 can also be secured to the rack 500, without securing to the holder 600 via the brim 605 of the aperture 603.

The holder 600 is one example of an accessory that can be secured to the rack 500 via the anchors 400. Other contemplated accessories are bags, vessels, gun racks, etc. The accessories have features designed to operate with the anchors 400 and the rack 500.

The holder 600 has a holder body 601 and two outwardly extending abutment tabs 602 (only one being shown). An aperture 603 is located in each abutment tab 602. The abutment tabs 602 and the aperture 603 are designed to cooperate with the anchors 400 and the rack aperture 550. It is contemplated that the aperture 603 could be located on the holder body 601. It is also contemplated that the aperture 603 could be omitted from the abutment tab 602. It is contemplated that one or more than two abutment tabs 602 and apertures 603 could be used to secure the holder 600. It is also contemplated that the abutment tabs 602 could be formed by a recess in the holder body 601. As seen from a top, the aperture 603 has an irregular pentagonal shape. The aperture 603 is congruent with an accessory receiving part (described below) of the anchor 400. It is contemplated that the aperture 603 could not be congruent with the anchor 400, as long as the aperture 603 allows the anchor 400 to be inserted partially therein, and allows the anchor 400 to rest on the abutment tab 602 once inserted. The aperture 603 has a rim 604 and an upper brim 605 (a lower brim of the aperture 603 not being shown). The upper brim 605 is flat. It is contemplated that the brim 605 could be chamfered. It is also contemplated that the aperture 603 could not be pentagonal. It is contemplated that in cases where the holder 600 does not comprise an aperture 603 to receive the anchor 400, that the accessory receiving part of the anchor 400 would connect to the abutment tab 602 itself for securing the holder 600 to the rack 500.

As best seen in FIG. 5, the anchors 400 can also be used to connect to a bungee cord 610 for retaining a box 612 onto the rack 500. The box 612 is one example of an item that could be retained by the anchors 400 with the bungee cord 610. Other accessories or items could be food coolers, chain saws, hunting equipment etc. The box 612 is not designed to cooperate with the anchors 400 (although it may be). The bungee cord 610 is one example of connectors that can be used with the anchors 400 to retain the box 612 to the rack 500. Other connectors could be tie downs, etc. In the configuration of FIG. 5 (which will be described in greater details below), the anchors 400 are conveniently positioned so as to provide a hooking point for the bungee cord 610 in proximity of the box 612. Since the box 612 is not designed to cooperate with the anchors 400, the anchors 400 are not to be inserted in any aperture of box 612. The anchors 400 are further conveniently positioned so as to provide an abutment wall for the box 612. It is contemplated that the anchor 400 could not provide an abutment wall for the box 612. It is contemplated that the anchors 400 could be used to provide an abutment wall and not be used in conjunction with the bungee cord 612.

Turning now to FIGS. 6 to 11, embodiments of the anchor 400 for the rack 500 will be described. Although the anchor 400 is described in conjunction with the rack 500, it is contemplated that the anchor 400 could also be used in conjunction with the racks 501, 500' and 500".

The anchor 400 has a case 402 and a latch 404 rotatably mounted to the case 402. The case 402 is made of metal and the latch 404 is made of plastic. It is contemplated that the case 402 and the latch 404 could be made of a same material. It is also contemplated that the case 402 and the latch 404 could be made of materials different from metal and plastic, respectively. The latch 404 is connected to the case 402 by a stem 406 extending through the latch 404. The stem 406 is made of metal. It is contemplated that the stem 406 could be made of a different material. The stem 406 has a T-shaped top 407 abutting against a lower wall 411 (shown in FIG. 8) of a cavity 413 (shown in FIG. 8) in the case 402. A C-clip 417 (shown in FIG. 8) is disposed between the T-top 407 of the stem 406 and the lower wall 411 of the case 402 to retain the stem 406 in the case 402. Four spring washers 408 are disposed toward a bottom 409 of the stem 406. The spring washers 408 bias the latch 404 upwards towards the case 402. A C-clip 410 is mounted into a recess 415 (shown in FIG. 6) in the stem 406. The C-clip 410 prevents the spring washers 408 and the latch 404 from sliding off the stem 406. Stem 406 and C-clip 417 are connected to case 402 prior to sliding latch 404 over the bottom end of the stem 406 and securing it to the stem C-spring washers 408 and C-clip 410. It is contemplated that a different number of spring washers 408 could be used. It is also contemplated that a biasing mechanism other than the spring washers 408 could be used for biasing the latch 404 toward the case 402. For example, one or more coil springs or a resilient member could be used.

Figure 6:
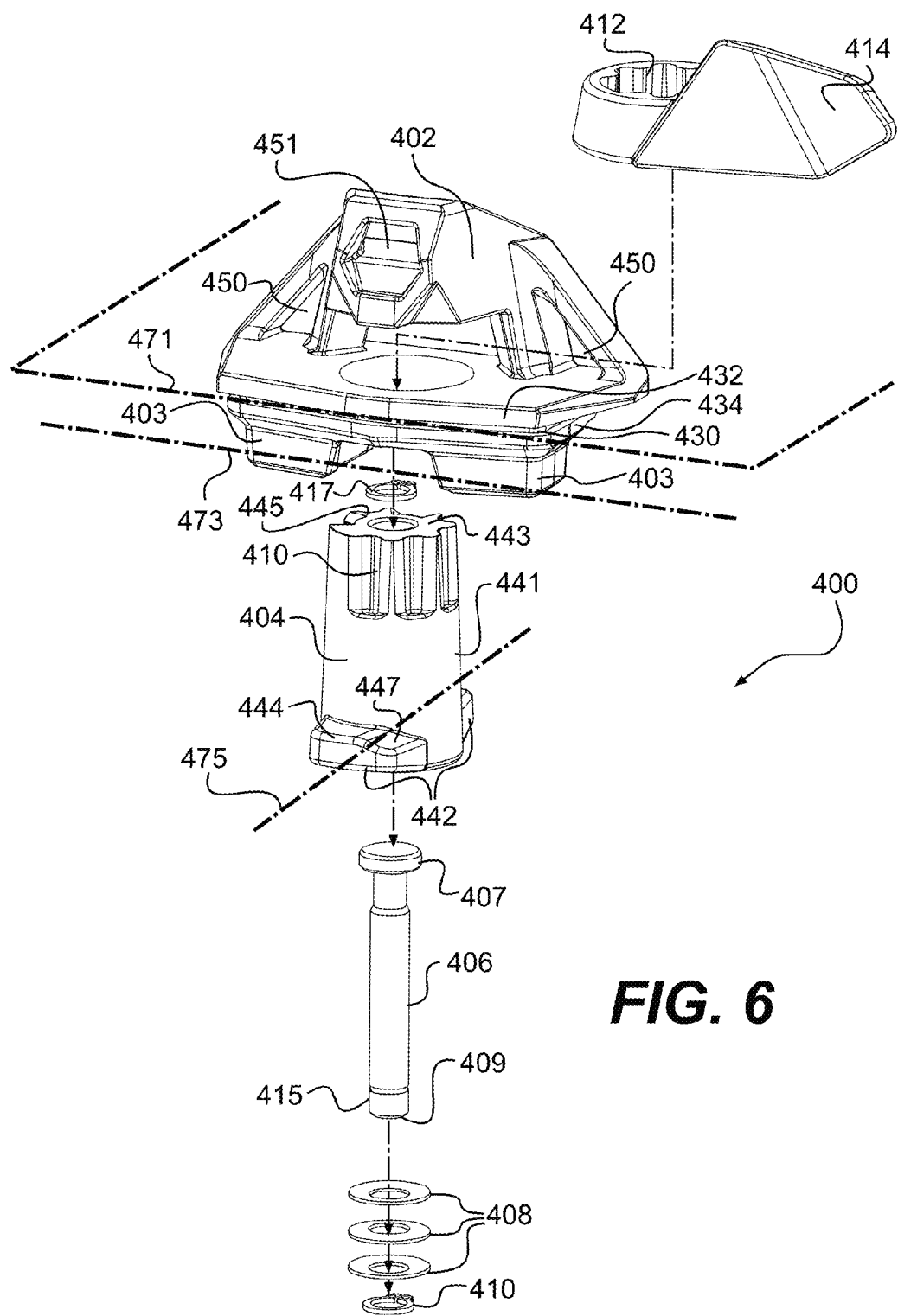
FIG. 6 is an exploded view of one of the anchors of FIG. 4A.

The latch 404 is operated by a lever 414. The lever 414 is made of a same plastic as the latch 404. It is contemplated that the lever 414 could be made of a different material. It is also contemplated that the lever 414 could be replaced by another actuation mechanism. For example the lever 414 could be a button. It is also contemplated that the lever 414 could be omitted. In such a case, the case 402 and the latch 404 could be connected such that the latch 404 would be turned by turning the case 402 itself. It is also contemplated that, in such a case, the anchor 400 could also include a spring loaded mechanism. As best seen in FIG. 6, a top of the latch 404 has a splined end 410 congruent with splines 412 of the lever 414. A top 443 of the splined end 410 has two notches 445. The two notches 445 accept a pin (not shown) on the case 402, and provide an indication that the anchor 400 is in the locked position or in the unlocked position, and that the user has fully rotated the lever 414 so as to not apply unnecessary force to the lever 414 for locking the anchor 400. The lever 414 can rotate by a quarter-turn between a first position (shown in phantom in FIG. 7) where the anchor 400 is unlocked and a second position (shown in solid in FIG. 7) where the anchor is locked. Rotation of the lever 414 is illustrated by arrow 421 in FIG. 7. Rotating the lever 414 forces the latch 404 to rotate and lock/unlock the anchor 400 as will be described in greater details below. It is contemplated that the lever 414 could rotate by more or less than a quarter-turn.

Figure 7:
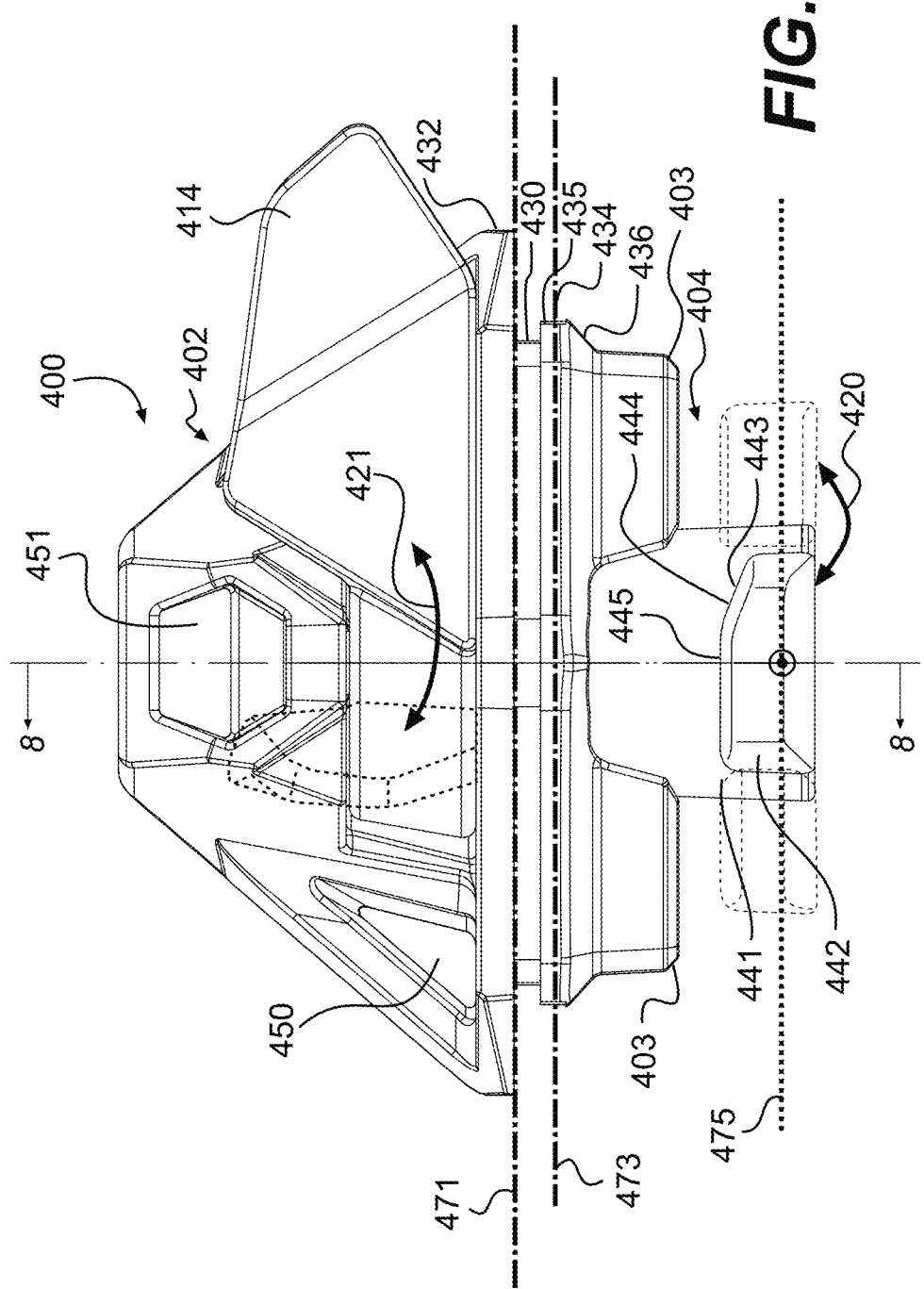
FIG. 7 is a side elevation view of one of the anchors of FIG. 4A in a locked position, and in an unlocked position shown in phantom.
Figure 8:
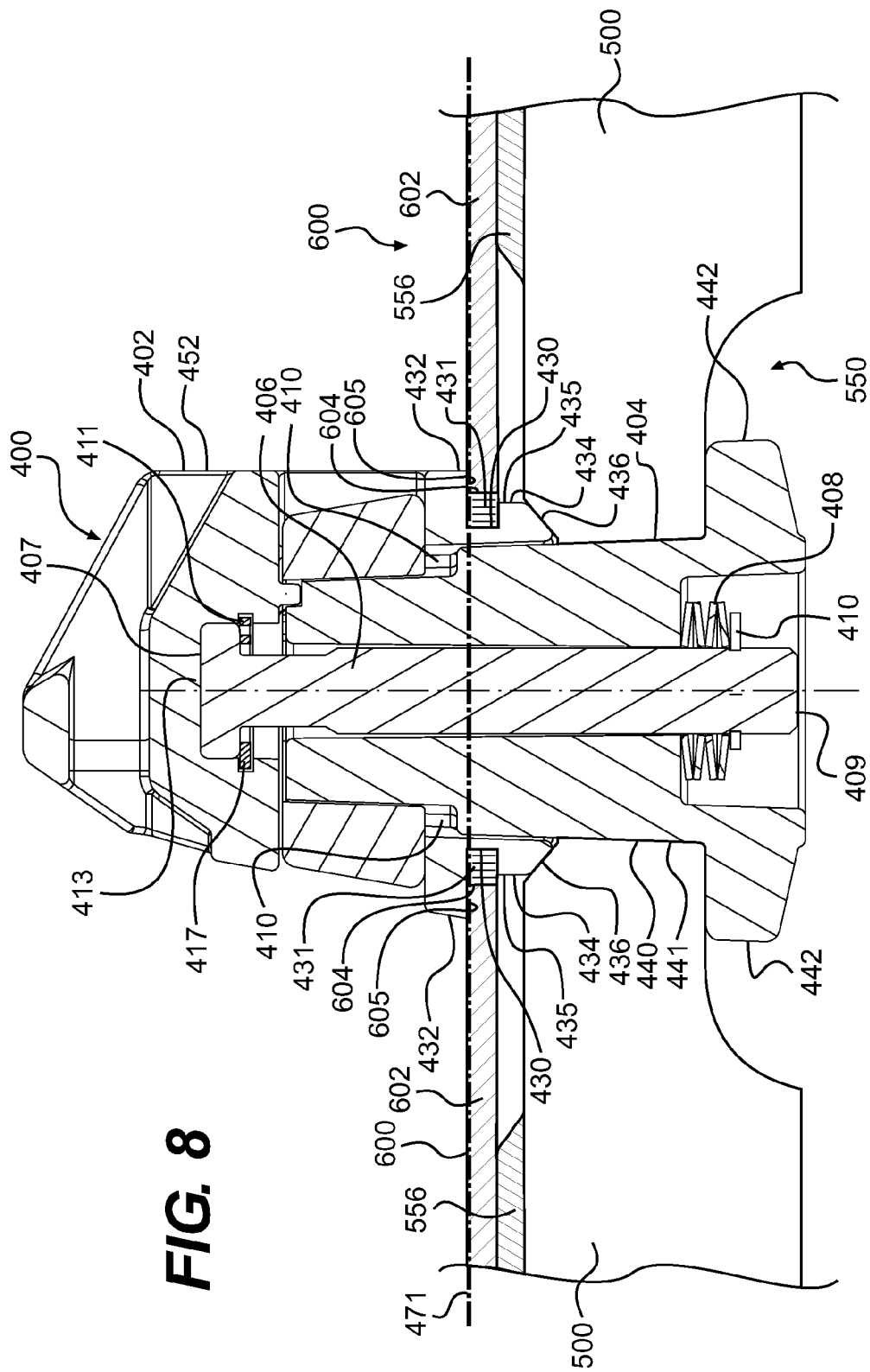
FIG. 8 is a cross-sectional view of the anchor taken along the line 8-8 of FIG. 7, with the anchor shown secured on the accessory and the rack of FIG. 4A.

As best seen in FIGS. 7 and 8, the case 402 has an upper flange 432 and a middle flange 434. The upper flange 432 and the middle flange 434 extend outwardly from an entire external surface of a cross-section of the case 402. It is contemplated that the upper flange 432 and the middle flange 434 could be disposed only on a portion of the external surface of the cross-section of the case 402.

A bottom surface of the upper flange 432 defines a horizontal plane 471 (shown in FIGS. 6-8). When the anchor 400 is inserted into the aperture 603 of the holder 600, a contour of the upper flange 432, projected onto the horizontal plane 471, extends beyond a contour of the aperture 603 (formed by the rim 604), and a contour of the middle flange 434 is contained within the contour of the aperture 603. Because the contour of the middle flange 434 is contained within the contour of the aperture 603, the middle flange 434 can be inserted into the aperture 603 without abutting against it. Furthermore, because the contour of the upper flange 432 extends beyond the contour of the aperture 603, when inserted into the aperture 603, the anchor 400 is prevented by the upper flange 432 from sliding upwards. As will be described below, the upper flange 432 constitutes an element of the accessory connecting part for securing the holder 600 to the rack 500, and the middle flange 434 constitutes an element of the rack connecting part for securing the anchor 400 to the rack 500.

The middle flange 434 has an upper part 435 and a lower part 436. The upper part 435 is a vertical wall having a thickness about the same as a thickness of the pads 556 of the rack 500. A recess 430, described below, is formed by and between the upper flange 432 and the upper part 435 of the middle flange 434.

Figure 9:
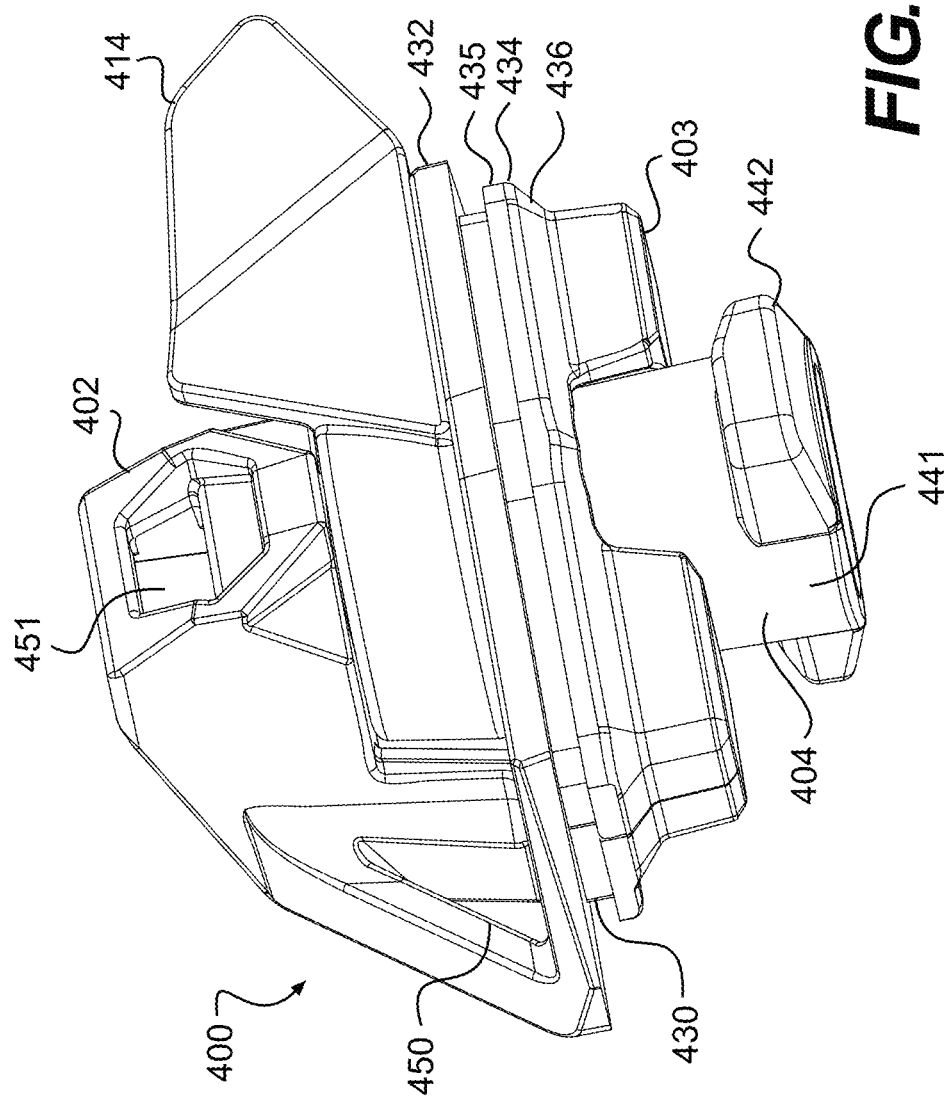
FIG. 9 is a perspective view of one of the anchors of FIG. 4A.

As best seen in FIG. 9, in a first embodiment of the upper part 435, when the anchor 400 is inserted into the aperture 603 and the rack aperture 550 and when projected onto the horizontal plane 471, a contour of the upper part 435 is pentagonal and congruent with the pentagonal shape of the aperture 603. The pentagonal shape allows to position the anchor 400 in only one orientation with respect to the holder 600. For example, in some cases, it is preferred that the anchor 400 be positioned with the lever 414 away from the holder 600, in order to access and operate the lever 414. Thus, the pentagon shape of the upper part 435 allows to position the anchor 400 in the aperture 603 with the lever 414 disposed away from the holder 600. It is contemplated that the upper part 435 of the middle flange 434 could be of a different shape. It is contemplated that, the upper part 435 of the middle flange 434 could have an irregular hexagonal contour. It is contemplated that the upper part 435 could not be congruent with the aperture 603. It is also contemplated that, the upper part 435 could be a vertical wall having a hexagonal contour congruent with the rack aperture 550.

Figure 10:
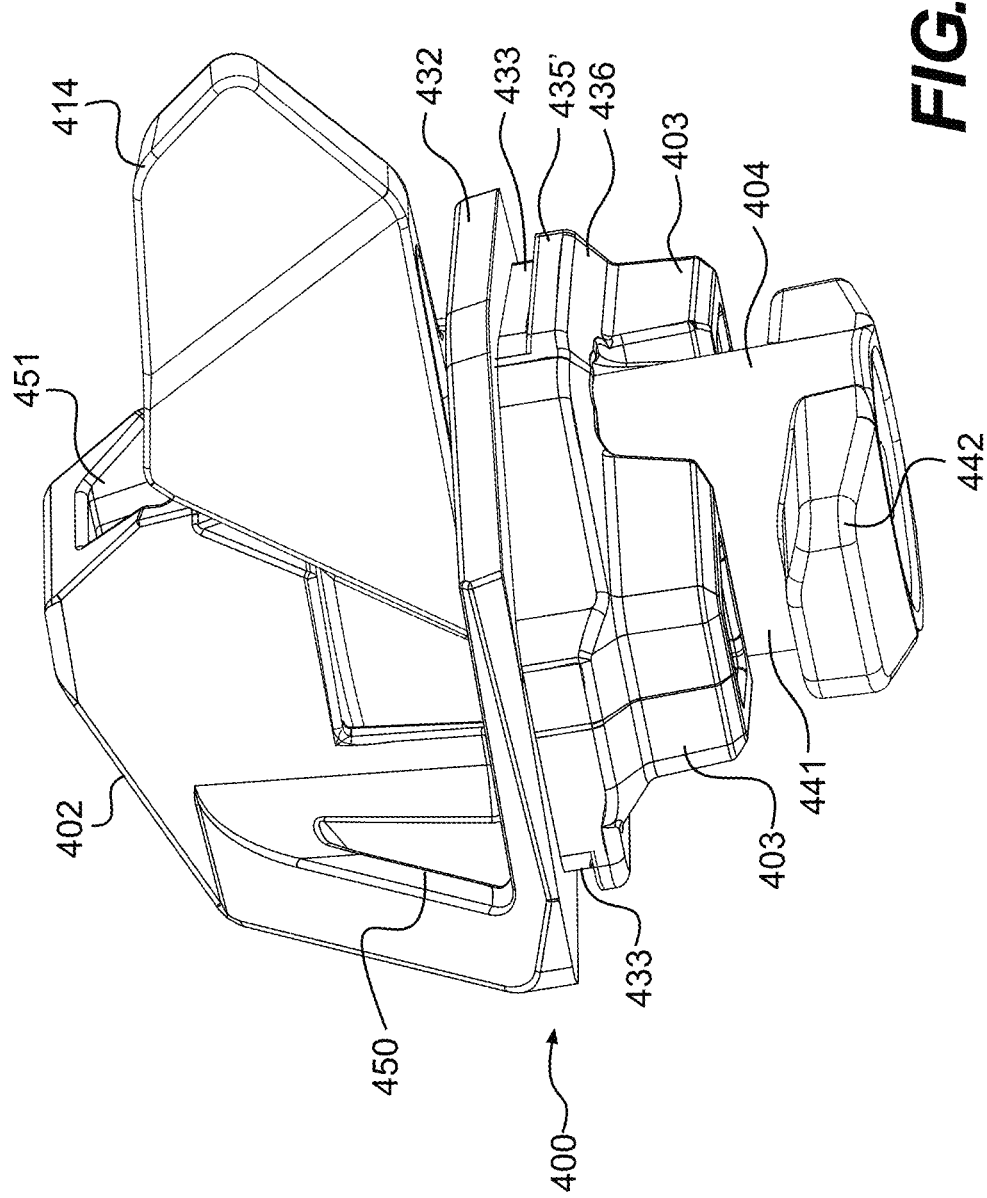
FIG. 10 is a perspective view of an alternative embodiment of one of the anchors of FIG. 4A.
Figure 11:
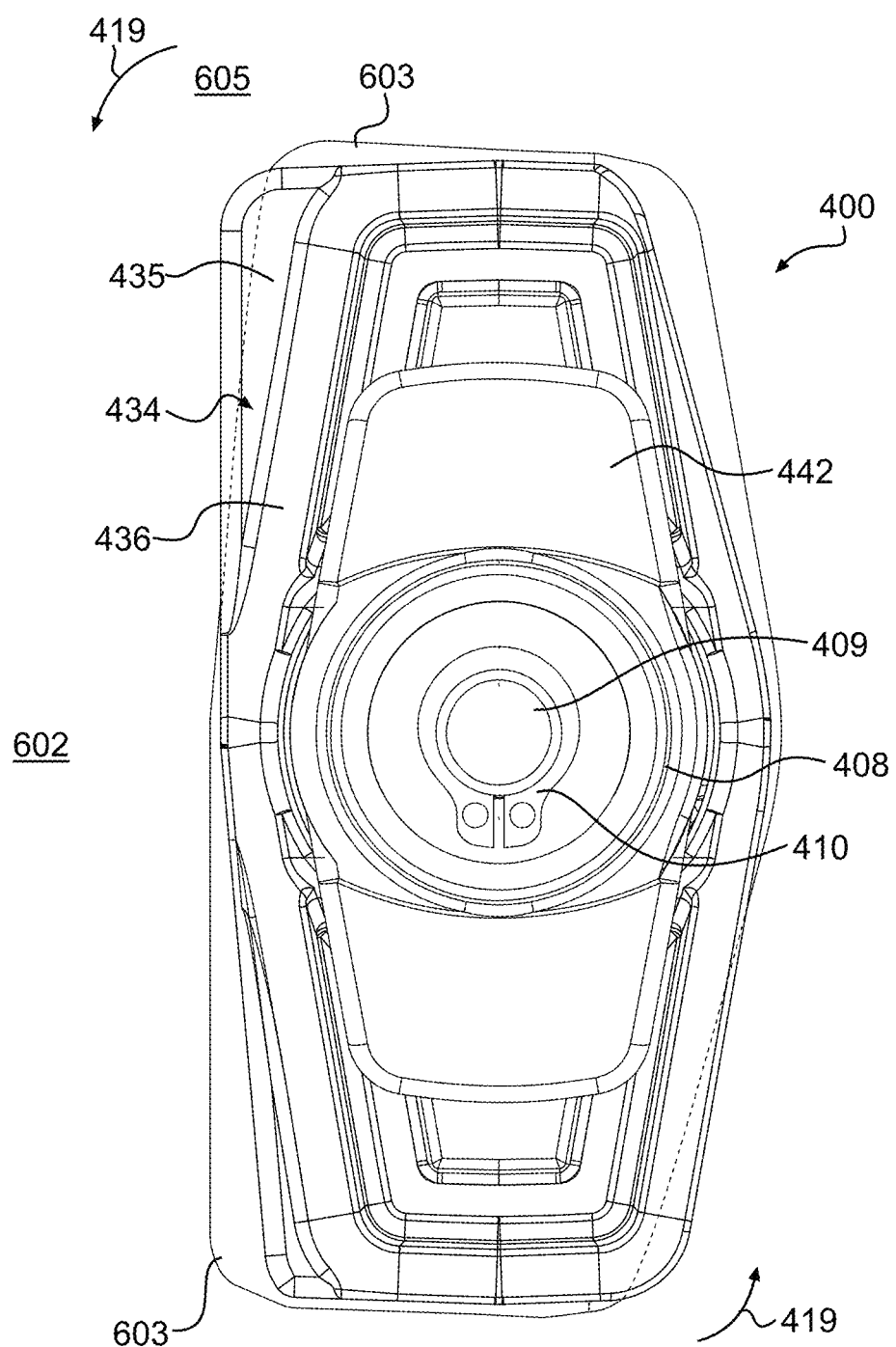
FIG. 11 is a bottom plan view of the anchor of FIG. 10 shown connected to the accessory of FIG. 4A.

As seen in FIGS. 10 and 11, in a second embodiment, the upper part 435' extends between the lower part 436 and the upper flange 432. No recess 430 is present between the upper flange 432 and the middle flange 434. The upper part 435' is similar to the upper part 435, but has a pair of slots 433. The slots 433 are disposed on opposite sides of the upper part 435'. The slots 433 each extend on a portion of the contour of the upper part 435', and on a portion of a height of the upper part 435'. Portions of the upper flange 432 and the upper part 435' disposed above and below, respectively, the slots 433 are generally triangular. The slots 433 provide an indentation extending at an angle of about 5 degrees with respect to the longitudinal axis 473. This indentation allows to brace the upper brim 605 of the aperture 603 by friction fit between the upper flange 432 and portions of the upper part 435' where the slots 433 are located. To ensure friction fit, the user rotates the anchor 400 relative to the holder 600 (shown in FIG. 11 with arrows 419). By doing so, the user can connect the anchor 400 to the holder 600 before inserting the anchor 400 in the rack aperture 550, as will be described below. It is contemplated that only one or more than two slots 433 could be used. It is also contemplated that the slots 433 could extend along the entire thickness of the upper part 435'. It is also contemplated that the slots 433 could extend along the entire contour of the upper part 435'. It is contemplated that, the slots 433 could provide an indentation at an angle of between 0 and about 10 degrees. It is contemplated that, a long side of the pentagonal contour of the upper part 435' could have a slight apex, thus forming a slightly irregular pentagonal upper part 435'. The slightly irregular pentagonal shape can be used to facilitate rotation of the anchor 400 with respect to the holder 600 when connecting the anchor 400 to the holder 600.

Turning back to FIGS. 6 to 9, the lower part 436 of the middle flange 434 is congruent with the rack aperture 550. When the anchor 400 is inserted into the rack aperture 550, a contour of the lower part 436, projected onto the horizontal plane 471, is contained within the contour of the upper part 435. The contour of the lower part 436 is hexagonal and congruent with a contour of the rack aperture 550. The lower part 436 is chamfered, and the chamfer is congruent with the chamfered upper brim 553 of the rack aperture 550. It is contemplated that the chamfered lower part 436 could be omitted. It is also contemplated that the lower part 436 could be different from chamfered. The lower part 436 is the part of the middle flange 434 that constitutes an element of the rack connecting part.

The recess 430 is formed by and between the upper flange 432 and the middle flange 434. When projected onto the horizontal plane 471, a contour of the recess 430 is pentagonal, and congruent with the pentagonal shape of the aperture 603. It is contemplated that the recess 430 could have a shape different from a congruent shape with the aperture 603. The recess 430 receives a seal 431 (shown in FIG. 8). The seal 431 creates a friction fit between the anchor 400 and the holder 600. In the case where the aperture 603 is located on the holder body 601, the seal 431 also prevents dirt from entering into the holder 600. When installing the holder 600 or whenever the holder 600 is not used, the seal 431 keeps the anchor 400 temporarily positioned with the holder 600. The seal 431 has a pentagonal shape 431, congruent with the shape of the recess 430. The seal 431 is made of rubber. It is also contemplated that the seal 431 could be made of any resilient material. It is contemplated that the seal 431 could cover only a portion of the recess 430. It is contemplated that the seal 431 could be watertight. It is also contemplated that the seal 431 could be omitted.

A pair of tabs 403 (shown best in FIGS. 6 and 7) extends downwardly vertically from the lower part 436 of the middle flange 434. It is contemplated that the pair of tabs 403 could extend downwardly and inwardly from the lower part 436 of the middle flange 434. When the anchor 400 is inserted into the aperture 603 of the holder 600 and into the rack aperture 550, a contour of the tabs 403, projected onto the horizontal plane 471, is contained within the contours of the rack aperture 550 and the aperture 603. Thus, when the anchor 400 is inserted in the rack aperture 550, the tabs 403 are disposed by the rim 552 of the rack aperture 550. It is contemplated that the tabs 403 could abut the rim 552 of the rack aperture 550 when inserted therein. A shape of the tabs 403 is congruent with the hexagonal shape of the rack apertures 550. The tabs 403 have an irregular hexagonal shape. The tabs 403 have a longitudinal direction along the longitudinal axis 473 (shared with the middle flange 434). The tabs 403 have a thickness which is smaller than a thickness of the rack 500. The tabs 403 can provide guidance to insert the anchor 400 in the rack aperture 550, as well as additional strength to the connection between the anchor 400 and the rack 500. It is contemplated that the tabs 403 could have a shape different from a hexagon. It is also contemplated that one or both tabs 403 could be omitted. It is contemplated that more than two tabs 403 could extend from the middle flange 434.

Two connectors 450 (shown in FIG. 6) are disposed on opposite sides of the case 402, and a connector 451 is disposed on top of the case 402 between the two connectors 450. The two connectors 450 are triangular apertures, and the connector 451 is a generally trapezoidal aperture. When desired, the connectors 450, 451 can be used to hook the bungee cord 610 to the anchor 400, as described above with respect to FIG. 5. It is contemplated that the case 402 could have no, only one, or more than two connectors 450, and no or more than one connector 451. It is contemplated that the connectors 450, 451 could be disposed at different locations on the case 402. It is contemplated that the connectors 450, 451 could have different shapes. It is also contemplated that the connectors 450, 451 could be designed differently. For example the connectors 450, 451 could be hooks.

A vertical wall 452 (shown in FIG. 8) is disposed on one side of the case 402. When desired, the vertical wall 452 can be used as an abutment wall to the box 612, as described above with respect to FIG. 5. It is contemplated that the case 402 could have no or more than one vertical wall 452. It is contemplated that the wall 452 could not be vertical.

The latch 404 will now be described. The latch 404 has a cylindrical latch body 441 and a pair of cams 442 extending outwardly from an end of the latch body 441 opposite to the splined end 410. The pair of cams 442 constitutes another element of the rack connecting part. It is contemplated that the latch body 441 could have a shape different from cylindrical. It is contemplated that one or more than two cams 442 could be connected to the latch body 441 depending on a shape of the rack aperture 550. The pair of cams 442 constitutes a lower flange of the anchor 400. When the anchor 400 is inserted into the rack aperture 550 and when projected onto the horizontal plane 471, the pair of cams 442 (mounted on the latch 404) has a hexagonal shape that is congruent with the rack aperture 550. The hexagon is irregular and has a longitudinal direction along a longitudinal axis 475 (shown in FIGS. 6 and 7).

The pair of cams 442 is rotatable via the lever 414 between a first position and a second position. Rotation of the cams 442 is illustrated by arrow 420 in FIGS. 7 and 13. In the first position (shown in FIG. 7 in dotted lines, and in FIG. 12), the anchor 400 is unlocked (i.e. free from the rack 500 and the holder 600), and the pair of cams 442 has a same orientation as the tabs 403. As shown in FIG. 12, in the first position, the longitudinal axes 473 and 475 of the middle flange 434 and cams 442, respectively, are aligned and form an angle of 0 degrees with respect to each other. When projected onto the horizontal plane 471, in the first position, a hexagonal contour of the cams 442 is contained within the pentagonal contour of the aperture 603 and the hexagonal contour of the rack aperture 550. When in the first position, the cams 442 are insertable through the aperture 603 and the rack aperture 550 to position the anchor 400 on the rack 500. It is contemplated that, in the first position, the longitudinal axes 473 and 475 could not be aligned with each other and could be at an angle with each other different from 0, as long as when projected onto the horizontal plane 471, the hexagonal contour of the cams 442 is contained within the hexagonal contour of the rack aperture 550 for inserting the cams 442 into the rack aperture 550.

In the second position (as shown in FIG. 7 in solid lines, and FIG. 13), the anchor 400 is locked, and the pair of cams 442 is positioned perpendicular to the tabs 403. As shown in FIG. 13, in the second position, the longitudinal axes 473 and 475 are perpendicular to each other and form an angle of 90 degrees with respect to each other. It is contemplated that the longitudinal axes 473, 475 could form an angle other than 90 degrees. When projected onto the horizontal plane 471, in the second position, the hexagonal contour of the cams 442 extends beyond the hexagonal contour of the rack aperture 550. When inserted in the rack aperture 550 and in the second position, the anchor 400 is secured to the rack 500 and the pair of cams 442 and the middle flange 434 brace the rack aperture 550 (rack connecting part). As will be described below, if the anchor 400 is inserted both in the aperture 603 and the rack aperture 550, in the second position, the middle flange 434 and the cams 442 brace the holder 600 against the rack 500 (accessory connecting part), thus securing the holder 600 to the rack 500.

Each of the cams 442 has a cam surface 444 (shown in FIG. 6) which slides against the ribs 548 of the rack 500 when the cams 442 are rotated between the first and the second position by the lever 414. The cam surface 444 includes an inclined surface 447. The inclined surface 447 is a ramp used in conjunction with the spring washers 408 to bias the cam 442 upward toward the middle flange 434.

The anchor 400 can be used in several ways. In a first example, the user desires to retain an item (e.g. box 612) onto the rack 500 using the bungee cord 610, similar to what is shown in FIG. 5. To do so, the user grabs an anchor 400 and selects a rack aperture 550 in function of where and how he/she desires to retain the accessory box 612. If not already done, the user moves the anchor 400 to the unlocked position (cams 442 in the first position) by rotating the lever 414 by a quarter-turn clockwise until the lever 414 extends beyond the case 402. The latch body 441 then moves by a quarter-turn from a position where the cams 442 are perpendicular to the tabs 403 (cams 442 in the second position), to a position where the cams 442 are in a same direction as the tabs 403 (cams 442 in the first position). Once the anchor 400 is in the unlocked position, the user positions the anchor 400 in the rack aperture 550. The lower part 436 of the middle flange 434 abuts against the upper brim 553 of the rack aperture 550. Once in place, the user moves the lever 414 by quarter-turn counter clockwise for locking the anchor 400 to the rack 500. By moving the lever 414, the latch body 441 moves by a quarter-turn from the position where the cams 442 had the same orientation as the middle flange 434 (cams 442 in the first position), to the position where the cams 442 are perpendicular to the middle flange 434 (cams 442 in the second position). During this motion, the inclined surfaces 447 slid against the ribs 548 until the cam surface 444 becomes in contact with the ribs 548. When the anchor 400 is locked to the rack 500, the user can position the box 612 by the anchor 400 (this step could also be done before locking the anchor 400 to the rack 500). The user connects an end of the bungee cord 610 to the aperture 450 of the anchor 400, wraps the bungee cord 610 around the box 612 and attaches the other end of the bungee cord 610 to the rack 500 or to another anchor 400 (previously or not) secured onto the rack 500.

To detach the box 612 from the rack 500, the user releases the bungee cord 610 from the aperture 450 of the anchor 400, and removes the box 610 from the rack 500. If the user desires further to unsecure the anchor 400 from the rack 500, the user moves the lever 414 by a quarter-turn clockwise, thereby moving the cams 442 back to the position where they are aligned with the middle flange 434 (cams 442 in the first position). The user can then remove the anchor 400 from the rack aperture 550. The user can reuse the anchor 400 again at a later time for a same or a different application.

In an alternative embodiment where the anchor 400 does not have the lever 414 and the latch 404 connected to move with the case 402, the user could secure the anchor 400 to the rack 500 by inserting the anchor 400 into the rack aperture 550. The user would then turn the anchor 400 so as to have the middle flange 434 and the cams 442 (now forming a lower flange) bracing the brims of the aperture 550. To detach the anchor 400 from the rack 500, the user could turn the anchor 400 back to a position where the flanges 434, 442 of the anchor 400 are aligned with the aperture 550, and remove the anchor 400 from the rack aperture 550.

Instead of or in addition of using the bungee cord 610, the user can use the vertical wall 452 as an abutment surface to the box 612, similarly to what has been described above with respect to FIG. 5. The user can select one of the rack apertures 550 and position the anchor 400 in the selected rack aperture 550 in such a way that the box 612 will have its motion constrained at least by the abutment wall.

In a second example, the user can use the anchor 400 for securing the holder 600 to the rack 500. To do so, the user grabs two anchors 400 and the holder 600, and selects two of the rack apertures 550 that are located at positions that allow to place the holder 600 where desired. The user first places the holder 600 on the top face of the rack 500, so that the apertures 603 and 550 are disposed one on top of the other in a way to allow insertion of the anchor 400 through the apertures 603 and 550. It is contemplated that the apertures 603 and 550 could be aligned or could be disposed at a slight angle with respect to each other, as long as the contour of the rack aperture 550 is contained within the contour of the aperture 603, so as to allow insertion of the anchor 400. The user then inserts the anchors 400, being in the unlocked position, into the apertures 603,550.

In the case where the anchor 400 has the upper part 435' of the middle flange 434 having the slots 433, the user first inserts the anchor 400 into the aperture 603 before positioning the holder 600 onto the rack 500. The user rotates the anchor 400 relative to the holder 600, so as to brace the aperture 603 in the slots 433 (shown in FIG. 11 with arrows 419) with portions of the upper flange 432 and portions of the lower part 436 of the middle flange 434, as described above. The user then disposes the anchor 400, which is connected by friction fit to the holder 600, into the rack aperture 550. Because the anchor 400 has been rotated with respect to the holder 600, when disposed into the rack aperture 550, the contour of the rack aperture 550 is no longer contained within the contour of the aperture 603. It is contemplated that, the contour of the rack aperture 550 could be contained within the contour of the aperture 603 when the anchor 400 secured to the holder 600 and the rack 550. It is also contemplated that the aperture 603 could be disposed at an angle in the abutment tab 602 so as to compensate for the slots 433 and so that when disposed into the rack aperture 550, the contour of the rack aperture 550 would be contained in the contour of the aperture 603.

When the anchor 400 is in the rack aperture 550, the middle flange 434 abuts against the upper brim 553 of the rack aperture 550 and the upper flange 432 abuts against the upper brim 605 of the aperture 603. To secure the holder 600 to the rack 500, the user locks the anchors 400 to the rack 500 one after the other, in a manner similar to the one described above, by moving the lever 414 so as to engage the pair of cams 442 with the rack 500. When the cams 442 are rotated and perpendicular to the middle flange 434, the anchor 400 also secures the holder 600 to the rack 500. The user can then fill the holder 600 with items. It is contemplated that the user could fill the holder 600 with items before securing the holder 600 to the rack 500. It is also contemplated that the user could use the bungee cord 610 to further secure the holder 600 or the items it transports onto the rack 500.

It is contemplated that, the user could also secure two holders 600 (as an example of two accessories) with a same anchor 400 to secure the holders 600 together disposed side-by-side in cases where the shapes of the upper part 435 of the middle flange 434 and the apertures 603 of the holders 600 would allow it (e.g. the upper part 435 is irregular and the apertures 603 of each holder 600 are oriented differently, or e.g. the upper part 435 and the apertures 603 of each holder 600 have a same regular shape). The user would dispose one abutment tab 602 so as to align the apertures 603 of each abutment tab 602 of each holder 600, and insert the anchor 400 into the accessory apertures 603 and the aperture 550 of the rack 500. The user would proceed as described above to secure the two holders 600 to the rack 500. Using two other anchors 400, the user would then secure the other abutment tabs 602 of each holder 600 to the rack 500, conveniently with two other rack apertures 550.

Also, a same anchor 400 could be used to secure partially an accessory and an item. For example, one anchor 400 could be used to secure one side of the holder 600. That same anchor 400 could also be used as a hooking point for the bungee cord 610 to retain the box 612 to the rack 500, the box 612 having been priory disposed adjacent to the holder 600. Another anchor 400 could be used to secure another side of the holder 600 for further securing the holder 600 to the rack 500, and yet another anchor 400 could be used to secure another end of the bungee cord 610 to the rack 500.

To unlock each anchor 400, the user moves the lever 414 back so as to orient the cams 442 in the same direction as the middle flange 434, in a manner similar to the one described above. The user then removes the anchor 400 from the rack 500 and the holder 600. By removing the anchor 400 from the rack 500, the user also removes the anchor 400 from the holder 600. In the case where the anchor 400 has the upper part 435' having the slots 433, the user performs the additional step of rotating the anchor 400 relative to the holder 600 (opposite to the direction shown by arrows 419 in FIG. 11) for disconnecting the anchor 400 from the holder 600. The user can then use each of them at a later time for a same or a different application.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

What is claimed is:

1. An anchor for selectively connecting to a base, the base having at least one hexagonal base aperture, the anchor comprising:
   a case having an integrally formed case flange, the case flange having a hexagonal contour congruent with the at least one hexagonal base aperture for inserting the anchor into the base;
   a latch operatively connected to the case, the latch including a latch body and a latch flange fixed to the latch body, the latch being movable about an axis relative to the case between a locked position and an unlocked position, in the locked position the latch flange being adapted to secure the anchor on the base, in the unlocked position the latch flange being adapted to permit insertion and removal of the anchor from the at least one hexagonal aperture of the base; and
   a lever connected to the latch for moving the latch between the locked and unlocked positions.

2. The anchor of claim 1, wherein the hexagonal contour of the case flange is chamfered.

3. The anchor of claim 1, wherein:
the case flange includes a lower part and an upper part, the lower part having the hexagonal contour, the upper part having a pentagonal contour including a vertical wall; and
a projection of the hexagonal contour onto a plane being contained within a projection of the pentagonal contour onto the plane.

4. The anchor of claim 3, wherein the lower part is chamfered.

5. The anchor of claim 4, further comprising two tabs extending from the lower part of the case flange;
wherein the latch is disposed at least in part between the two tabs.

6. The anchor of claim 5, wherein the two tabs define a hexagonal shape.

7. The anchor of claim 3, wherein:
the case flange is a first case flange;
the case includes a second case flange;
the projection of the hexagonal contour onto the plane and the projection of the pentagonal contour onto the plane being contained within a projection of a contour of the second case flange onto the plane.

8. The anchor of claim 7, wherein:
the latch flange extends perpendicularly to the axis;
when in the unlocked position, a contour of the latch flange projected onto the plane is contained within the projection of the hexagonal contour onto the plane, and
when in the locked position, the contour of the latch flange projected onto the plane extends beyond the projection of the hexagonal contour onto the plane.

9. The anchor of claim 8, further comprising:
a recess disposed between the first case flange and the second case flange, and
a seal disposed in the recess.

10. The anchor of claim 8, further comprising a biasing mechanism biasing the latch flange toward the second case flange.

11. The anchor of claim 8, wherein:
the latch flange includes a pair of cams; and
each of the pair of cams has a ramp surface.

12. The anchor of claim 3, wherein:
the lever is connected to a first end of the latch;
the latch flange includes at least one cam extending from a second end of the latch, the second end being opposite the first end;
the at least one cam is generally perpendicular to the axis;
the at least one cam having a contour;
in the locked position, the contour of the at least one cam extends outside of the contour of the lower part; and
in the unlocked position, the contour of the at least one cam is received within the contour of the lower part.

13. The anchor of claim 1, wherein:
the latch body passes through an aperture in the case to connect with the lever, the lever and the latch flange being disposed on opposite sides of the case flange.

14. The anchor of claim 1, wherein:
the latch is rotatable about the axis; and
rotating the latch about the axis braces the hexagonal contour of the case flange against a surface of the hexagonal base aperture.

15. The anchor of claim 1, wherein:
a portion of the lever is disposed on one side of the case flange such that a projection of the lever on a plane extends beyond the projection of the hexagonal contour on the plane, the plane being perpendicular to the axis.

16. The anchor of claim 1, wherein:
the latch is rotatable about the axis;
the lever is rotatable about the axis; and
rotating the lever about the axis rotates the latch about the axis between the locked and unlocked positions.

17. An anchor for selectively connecting to a base, the base having at least one base aperture, the anchor comprising:
a case having an integrally formed case flange for making contact with a first side of the base, the case flange having a hexagonal contour congruent with the at least one hexagonal base aperture for inserting the anchor into the base;
a latch operatively connected to the case, the latch being movable about an axis relative to the case between a locked position and an unlocked position,
in the locked position, the latch being adapted to contact a second side of the base opposite the first side to secure the anchor to the base,
in the unlocked position, the latch being adapted to permit insertion and removal of the anchor from the at least one aperture of the base;
a biasing member biasing the latch towards the case flange along the axis, and
a lever connected to the latch for moving the latch between the locked and unlocked positions.

18. The anchor of claim 17, wherein:
the lever is removably connected to the latch such that the latch can move with respect to the lever along the axis.

19. The anchor of claim 17, further comprising a stem connecting the latch to the case, wherein:
the latch further comprises at least one cam; and
the biasing member is situated between the stem and the latch.

20. The anchor of claim 19, wherein:
the case flange is a first case flange; and
the anchor further comprises a second case flange situated on a side of the first case flange opposite from the at least one cam, the second case flange having a contour extending beyond a contour of the first case flange.

* * * * *

UNITED STATES PATENT AND TRADEMARK OFFICE
CERTIFICATE OF CORRECTION

PATENT NO. : 9,511,704 B2
APPLICATION NO. : 14/330831
DATED : December 6, 2016
INVENTOR(S) : Alain Massicotte et al.

It is certified that error appears in the above-identified patent and that said Letters Patent is hereby corrected as shown below:

In the Drawings

Please replace Fig. 8 with attached replacement Fig. 8

Signed and Sealed this
Seventh Day of November, 2017

Joseph Matal
*Performing the Functions and Duties of the*
*Under Secretary of Commerce for Intellectual Property and*
*Director of the United States Patent and Trademark Office*